United States Patent
Choi et al.

(10) Patent No.: US 10,800,522 B2
(45) Date of Patent: Oct. 13, 2020

(54) FLIGHT CONTROL METHOD AND ELECTRONIC DEVICE FOR SUPPORTING THE SAME

(71) Applicant: Samsung Electronics Co., Ltd, Suwon-si (KR)

(72) Inventors: In Hyuk Choi, Seoul (KR); Youn Lea Kim, Suwon-si (KR); Dong Hyun Chang, Suwon-si (KR); Bo Kun Choi, Seoul (KR); Sung Jun Kim, Daegu (KR); Seung Nyun Kim, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 15/806,110

(22) Filed: Nov. 7, 2017

(65) Prior Publication Data

US 2018/0155023 A1 Jun. 7, 2018

(30) Foreign Application Priority Data

Dec. 5, 2016 (KR) .......................... 10-2016-0164696

(51) Int. Cl.
*B64C 39/02* (2006.01)
*G05D 1/02* (2020.01)
(Continued)

(52) U.S. Cl.
CPC ......... *B64C 39/024* (2013.01); *G05D 1/0016* (2013.01); *G05D 1/0022* (2013.01);
(Continued)

(58) Field of Classification Search
CPC ........ B64C 2201/127; B64C 2201/146; B64C 39/024; B64C 2201/141; G05D 1/0016;
(Continued)

(56) References Cited

U.S. PATENT DOCUMENTS 10,029,804 B1 * 7/2018 Chamberlain ............ G06T 7/11
10,425,576 B2 * 9/2019 Kim ....................... H04N 5/232
(Continued)

FOREIGN PATENT DOCUMENTS

JP 2006027448 A 2/2006
KR 20150097274 A 8/2015
WO 2015/180133 A1 12/2015

OTHER PUBLICATIONS

European Search Report dated May 2, 2018 in connection with European Patent Application No. 17 20 5436.

*Primary Examiner* — Angelina Shudy

(57) ABSTRACT

An electronic device includes a communication circuit configured to communicate with an unmanned aerial vehicle (UAV) including a camera, a memory configured to store first flight information including a first flight pattern for a first location and first driving information of the camera, the first driving information corresponding to the first flight pattern, and a processor configured to be operatively connected with the communication circuit and the memory. The processor is configured to determine a flight reference location of the UAV, and control the UAV via the communication circuit such that the UAV flies based on the determined flight reference location and the first flight information.

18 Claims, 31 Drawing Sheets

(51) Int. Cl.
   *G08G 5/00* (2006.01)
   *G05D 1/00* (2006.01)
   *G08G 5/04* (2006.01)
   *G06T 7/70* (2017.01)

(52) U.S. Cl.
   CPC ......... G05D 1/0038 (2013.01); G05D 1/0094 (2013.01); G05D 1/0202 (2013.01); G06T 7/70 (2017.01); G08G 5/0039 (2013.01); G08G 5/0069 (2013.01); G08G 5/045 (2013.01); *B64C 2201/127* (2013.01); *B64C 2201/141* (2013.01); *B64C 2201/146* (2013.01); *G06T 2207/10032* (2013.01)

(58) Field of Classification Search
   CPC .. G05D 1/0022; G05D 1/0038; G05D 1/0094; G05D 1/0202; G05D 1/0011; G05D 1/101; G05D 1/0088; G06T 2207/10032; G06T 7/70; G08G 5/0039; G08G 5/0069; G08G 5/045; B64D 47/08
   USPC ....................................................... 701/2, 3
   See application file for complete search history.

(56) References Cited

U.S. PATENT DOCUMENTS

| | | | |
|---|---|---|---|
| 2005/0069207 A1* | 3/2005 | Zakrzewski | B64D 45/0015 382/190 |
| 2007/0290918 A1* | 12/2007 | Filias | G05D 1/0646 342/29 |
| 2012/0307042 A1 | 12/2012 | Lee et al. | |
| 2016/0117811 A1 | 4/2016 | Tariolle et al. | |
| 2016/0306351 A1* | 10/2016 | Fisher | G01S 19/13 |
| 2017/0083027 A1 | 3/2017 | Tao et al. | |
| 2017/0127652 A1* | 5/2017 | Shen | A01K 15/021 |
| 2017/0339337 A1* | 11/2017 | Kim | B64C 39/024 |
| 2018/0046187 A1* | 2/2018 | Martirosyan | G05D 1/0094 |
| 2019/0011921 A1* | 1/2019 | Wang | G06K 9/00664 |
| 2019/0265733 A1* | 8/2019 | Zhou | G05D 1/10 |

* cited by examiner

| | Info type | Parameters 590 |
|---|---|---|
| 571 | GPS | Latitude / Longitude / Altitude / Speed / ... |
| 572 | IMU | Accel / Angle / ... |
| 573 | MAG | Identifier / X / Y / Z / ... |
| 574 | BARO | Pressure / Temperature / ... |
| 575 | SONAR | Range / ... |
| 576 | OFS | X / Y / Pixel / ... |
| 577 | Attitude | Pitch / Roll / Yaw / Throttle / ... |
| 578 | Camera | Size / Direction / Zoom / AF / HDR / AWB / ISO / FOV / Effect / Enhanced Feature / ... |
| 579 | Device | Weight / Size / Motor / Max Speed / ... |

FLIGHT CONTROL METHOD AND ELECTRONIC DEVICE FOR SUPPORTING THE SAME

CROSS-REFERENCE TO RELATED APPLICATION(S)

The present application is related to and claims the benefit under 35 U.S.C. § 119(a) of Korean Patent Application No. 10-2016-0164696, filed Dec. 5, 2016, the entire disclosure of which is hereby incorporated by reference.

TECHNICAL FIELD

The present disclosure relates to a flight control method and an electronic device for supporting the same.

BACKGROUND

An unmanned aerial vehicle (UAV), such as a drone, may perform functions, such as aerial video capture or crop-dusting, using a camera. Particularly, recently, UAV technology in which aerial technology is grafted onto electronic technology may have become popular. Ordinary persons may easily obtain aerial videos using a high-performance UAV of an inexpensive price.

Such a UAV may be controlled through an electronic device such as a dedicated controller or a smartphone. For example, a user may control a flight state, such as a location or altitude of a UAV, using the electronic device such as the dedicated controller or the smartphone and may control a video capture function of changing an angle of view of a camera installed in the UAV.

SUMMARY

However, since a user is requested to learn dedicated camera control technology as well as skilled aerial technology to capture a high-quality aerial video using a UAV, there is a limitation that an ordinary person captures a high-quality video with high satisfaction.

Aspects of the present disclosure are to address at least the above-mentioned problems and/or disadvantages and to provide at least the advantages described below. Accordingly, an aspect of the present disclosure is to provide a method for controlling flight of an unmanned aerial vehicle (UAV) based on obtained flight information and an electronic device for supporting the same.

In accordance with an aspect of the present disclosure, an electronic device includes a communication circuit configured to communicate with an unmanned aerial vehicle (UAV) including a camera, a memory configured to store first flight information including a first flight pattern for a first location and first driving information of the camera, the first driving information corresponding to the first flight pattern, and a processor configured to be operatively connected with the communication circuit and the memory. The processor is configured to determine a flight reference location of the UAV, and control the UAV via the communication circuit such that the UAV flies based on the determined flight reference location and the first flight information.

In accordance with another aspect of the present disclosure, an electronic device includes a display, a user interface configured to be detached or integrated with the display, at least one wireless communication circuit configured to establish a wireless communication channel with a UAV including a camera, a processor configured to be electrically connected with the display, the user interface, and the at least one wireless communication circuit, and a memory configured to be electrically connected with the processor. The memory stores instructions, when executed, causing the processor to store at least one or more previously configured flight paths in the memory at least temporarily, establish a wireless communication channel with the UAV using the at least one wireless communication circuit, receive a user input for selecting a flight path of the at least one or more previously configured flight paths through the user interface, receive first geographic data associated with at least one of the electronic device and the UAV using the at least one wireless communication circuit, calibrate the selected flight path based on at least part of the received first geographic data, and transmit information about the calibrated flight path to the UAV over the wireless communication channel.

In accordance with another aspect of the present disclosure, a flight control method of a UAV having a camera includes obtaining first flight information including a first flight pattern for a first location and first driving information of the camera, the first driving information corresponding to the first flight pattern, determining a flight reference location of the UAV, and controlling the UAV via the communication circuit such that the UAV flies based on the determined flight reference location and the first flight information.

Embodiments disclosed in the present disclosure may obtain a high-quality aerial video without skilled flight technology and delicate camera control technology by controlling flight of a UAV based on obtained flight information.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5B illustrates a type of data included in flight information according to various embodiments of the present disclosure;

DETAILED DESCRIPTION

Figure 1:
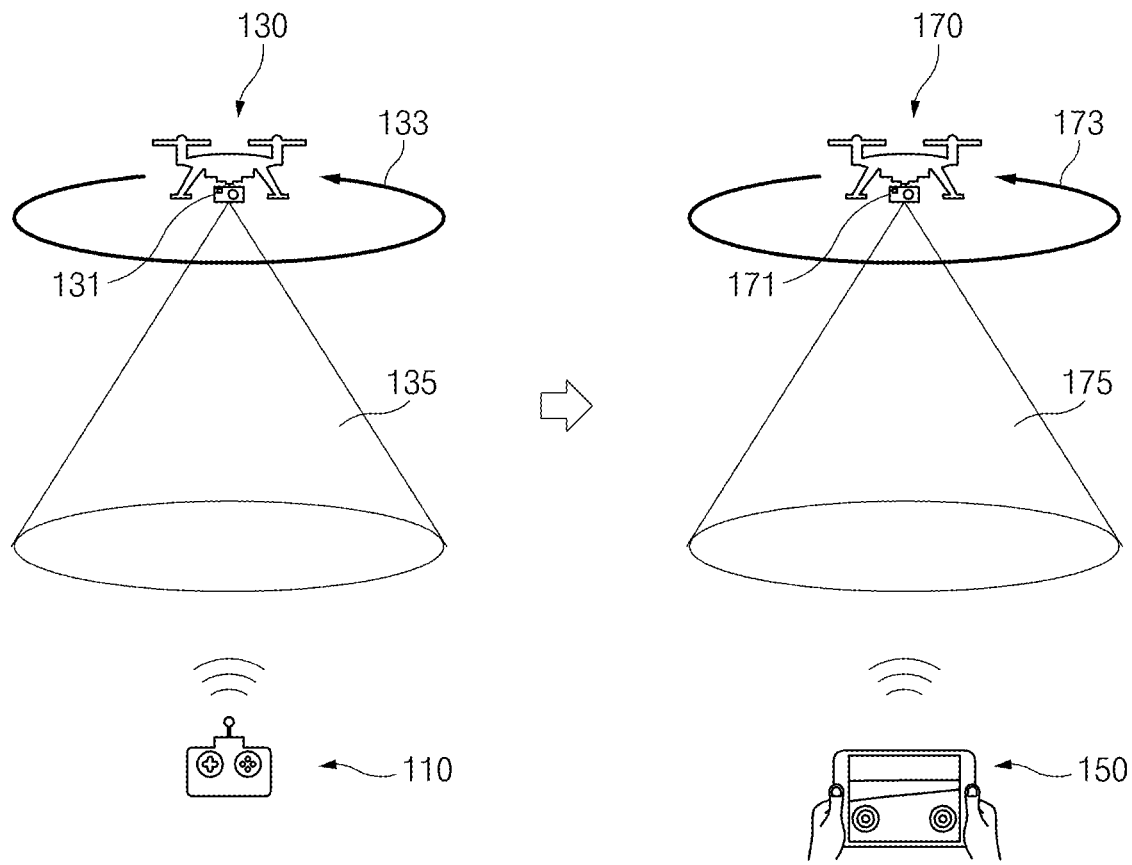
FIG. 1 illustrates a flight environment of an unmanned aerial vehicle (UAV) according to various embodiments of the present disclosure.

FIGS. 1 through 24C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or Play Station™), an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates a flight environment of an unmanned aerial vehicle (UAV) according to an embodiment.

Referring to FIG. 1, a UAV (e.g., a first UAV 130 or a second UAV 170) may be controlled through a first electronic device 110 (e.g., a dedicated controller) or a second electronic device 150 (e.g., a smartphone or a tablet personal computer (PC)). For example, a user may operate an electronic device such as the dedicated controller or the smartphone to control a flight state such as a location or altitude of the UAV and control a video capture function, for example, may change an angle of view of a camera (e.g., a first camera 131 or a second camera 171) installed in the UAV.

According to an embodiment, an electronic device for controlling the UAV may control flight of the UAV based on flight information. For example, the second electronic device 150 may control flight of the second UAV 170 based on flight information of the first UAV 130. For another example, the first electronic device 100 may control flight of the first UAV 130 based on flight information of the second UAV 170. The flight information may include, for example, flight pattern information of a UAV (e.g., information about a first flight pattern 133 or information about a second flight pattern 173) and video capture information (or driving information) of a camera installed in the UAV (e.g., information about a first video capture region 135 or information about a second video capture region 175). The flight pattern information may include flight state information, for example, location movement of the UAV or a change in altitude of the UAV. The video capture information may include a video capture start time of the camera, a video capture end time of the camera, information about an angle of view, or the like.

According to various embodiments, the first electronic device 101 may control flight of the second UAV 170 based on flight information of the first UAV 130. The second electronic device 150 may control flight of the first UAV 130 based on flight information of the second UAV 170. As a result, if having only previously generated flight information, the electronic device may control flight of any UAV to be substantially the same as the previously generated flight information. Thus, the user may perform flight of a UAV to substantially the same as a flight pattern previously adjusted by another user and him or her. Further, the electronic device may obtain a video of substantially the same composition as a previously obtained capture video by driving a camera included in the UAV upon the flight.

Figure 2:
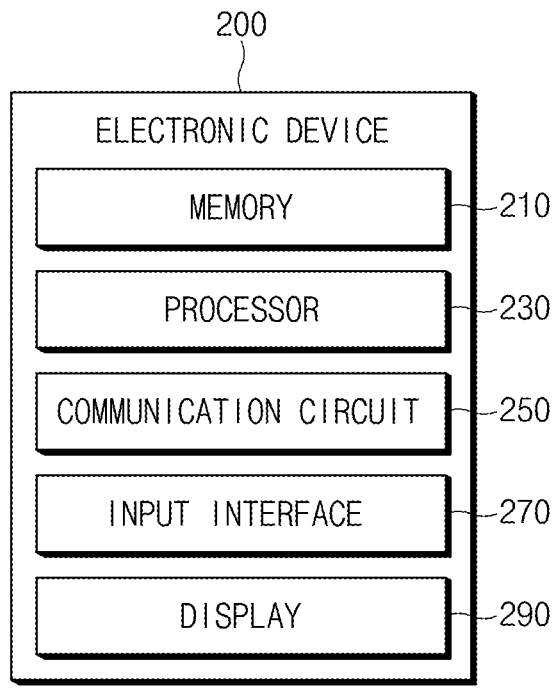
FIG. 2 illustrates a block diagram of a configuration of an electronic device associated with controlling flight of a UAV according to various embodiments of the present disclosure.

FIG. 2 illustrates a block diagram of a configuration of an electronic device associated with controlling flight of a UAV according to various embodiments of the present disclosure.

Referring to FIG. 2, an electronic device 200 (e.g., a first electronic device 110 or a second electronic device 150 of FIG. 1) may include a memory 210, a processor 230, a communication circuit 250 (or a communication module), an input interface 270, and a display 290. However, the elements of the electronic device 200 are not limited thereto. According to various embodiments, the electronic device 200 may not include at least one of the above-described elements or may further include other element(s).

The memory 210 may store instructions or data associated with at least one other element(s) of the electronic device 200. According to an embodiment, the memory 210 may store flight information of a UAV. For example, the memory 210 may store flight pattern information of the UAV or video capture information of a camera installed in the UAV. For another example, the memory 210 may store a capture video obtained by the camera. For another example, the memory 210 may store instructions or data associated with controlling flight of the UAV. The memory 210 may include a volatile and/or non-volatile memory.

The processor 230 may perform an arithmetic operation or data processing associated with control and/or communication of at least one other element(s) of the electronic device 200. The processor 230 may load an instruction or data, received from at least one of other elements (e.g., a non-volatile memory), into a volatile memory and may process the loaded instruction or data. The processor 230 may store a variety of data in the non-volatile memory. According to an embodiment, the processor 230 may load an instruction or data associated with controlling flight of a UAV, stored in the memory 210, into a volatile memory and may process the loaded instruction or data depending on a specified program routine. The processor 230 may include one or more of a central processing unit (CPU), an application processor (AP), or a communication processor (CP).

According to an embodiment, the processor 230 may obtain flight information of the UAV. For example, the processor 230 may receive flight information from the UAV connected via the communication circuit 250. Alternatively, the processor 230 may obtain flight information of the UAV based on a control signal transmitted to the UAV. In some embodiments, the processor 230 may obtain flight information of the UAV from another electronic device for controlling the UAV. In this case, the other electronic device may be wiredly or wirelessly connected with the electronic device 200 via the communication circuit 250.

According to an embodiment, the processor 230 may obtain location information of the electronic device 200 or location information of the UAV based on the communication circuit 250. For example, the processor 230 may obtain location information of the electronic device 200 through a location-based sensor (e.g., a global positioning system (GPS) or the like) or may obtain location information of the UAV from the UAV connected through wired/wireless communication.

According to an embodiment, the processor 230 may determine a flight reference location of the UAV using the location information of the electronic device 200 or location information of the UAV together with a flight start point included in the obtained flight information. The flight reference location may be substantially the same location as the flight start point and may be a calibrated location shifted to a specified flight area different from the flight start point. Alternatively, the flight reference location may be a location calculated according to a relative location from a specified subject with respect to the specified subject.

According to an embodiment, the processor 230 may control the UAV based on the communication circuit 250. For example, the processor 230 may transmit a control signal associated with flight to the UAV via the communication circuit 250. The control signal may include a flight state control signal (e.g., a throttle up/down signal, a yaw left/right signal, a pitch up/down signal, a roll left/right signal, or the like), such as a location movement signal or an altitude change signal of the UAV, or a camera driving signal (e.g., a video capture start/pause/stop signal, a pitch up/down signal of a camera frame, or a roll left/right signal of the camera frame), such as a change signal of an angle of view of a camera installed in the UAV.

According to an embodiment, the processor 230 may control the UAV based on the flight reference location and the flight information. For example, the processor 230 may transmit a control signal to the UAV via the communication circuit 250 such that the UAV flies and capture a video to be substantially the same as the flight information.

According to an embodiment, the processor 230 may calculate a flight path of the UAV based on the flight reference location and the flight information. Further, if a flight path of the UAV is included in a flight restricted area (or a flight prohibited area) or if there is an obstacle on the flight path, the processor 230 may calibrate the flight information. For example, the processor 230 may calibrate the flight information such that the flight path does not enter the flight restricted area or may calibrate the flight information to make a detour around the obstacle which exists on the flight path. In some embodiments, the processor 230 may inform a user that it is impossible for the UAV to fly, through the display 290. For example, the processor 230 may output a display object, for informing notification that it is impossible to fly, on the display 290.

According to an embodiment, the processor 230 may include flight information of the UAV in a video captured by a camera installed in the UAV and may store the video in the memory 210. For example, the processor 230 may include the flight information in metadata of the capture video. However, embodiments are not limited thereto. In some embodiments, the processor 230 may generate the flight information as an independent file to be independent of the capture video and may store the generated file in the memory 210.

According to an embodiment, the processor 230 may output a video captured by a camera installed in the UAV on the display 290. In some embodiments, the processor 230 may control the UAV based on the flight information and may output a capture video received from the UAV on the display 290 as a result of the control together with a capture video corresponding to the flight information.

The communication circuit 250 may establish communication between the electronic device 200 and an external device (e.g., a UAV, another electronic device for controlling the UAV, a server for sharing flight information of the UAV, or the like). For example, the communication circuit 250 may be connected to a network through wireless communication or wired communication and may communicate with the external device.

The input interface 270 may transmit an instruction or data, input from the user or another external device, to other element(s) of the electronic device 200. For example, the input interface 270 may be an interface which may adjust a UAV or may control a camera installed in the UAV. According to an embodiment, the input interface 270 may include an operation lever. In some embodiments, the input interface 270 may be output as a display object corresponding to the operation lever on the display 290.

The display 290 may display, for example, a variety of content (e.g., text, an image, an audio, a video, an icon, a symbol, and/or the like) to a user. According to an embodiment, the display 290 may output a video captured by a camera installed in the UAV. The display 290 may include, for example, a liquid crystal display (LCD), a light-emitting diode (LED) display, an organic LED (OLED) display, a microelectromechanical systems (MEMS) display, or an electronic paper display. According to an embodiment, the display 290 may include a touch screen and may receive, for example, a touch, a gesture, proximity, or a hovering input using an electronic pen or a part of a user's body.

Figure 3:
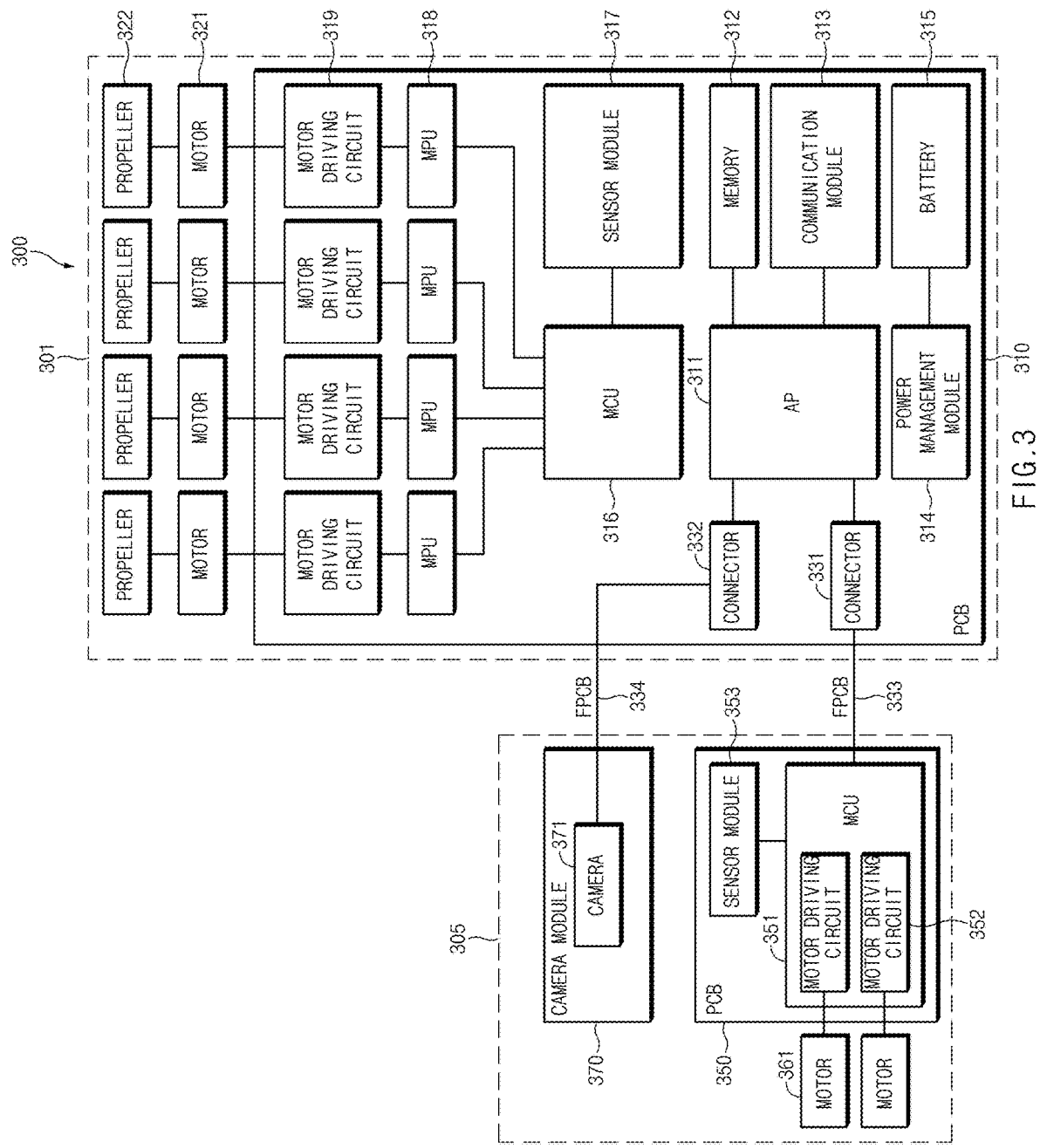
FIG. 3 illustrates a block diagram of a configuration of a UAV according to various embodiments of the present disclosure.

FIG. 3 illustrates a block diagram of a configuration of a UAV according to various embodiments of the present disclosure.

Referring to FIG. 3, a UAV 300 may include a flight body 301 and an imaging device 305, mounted on the flight body 301, for capturing a video. The flight body 301 may include a flight driving unit for flight of the UAV 300, a controller for controlling the UAV 300, a communication unit for communication with a remote controller (e.g., an electronic device 200 of FIG. 2), and a power management module 314 for power management of the UAV 300.

The flight driving unit may play a role in generating power for floating the flight body 301 in the air. According to an embodiment, the flight driving unit may include at least one propeller 322, at least one motor 321 for respectively rotating the at least one propeller 322, at least one motor driving circuit 319 for respectively driving the at least one motor 321, and at least one motor controller (e.g., at least one micro processing unit (MPU) 318) for respectively providing a control signal to the at least one motor driving circuit 319.

The controller may drive the flight driving unit depending on a control signal received through the communication unit from the remote controller and may control motion or movement of the UAV 300. The controller may execute an arithmetic operation or data processing associated with control and/or communication of at least one other element(s) of the UAV 300. The controller may be connected with the communication unit (e.g., a communication module 313), a memory 312, and the motor controller to control each element. The controller may include at least one processor (e.g., an AP 311). According to an embodiment, the controller may be connected with a sensor module 317 and may include a processor (e.g., a micro control unit (MCU) 316) which manages the motor controller in an integrated manner.

The communication unit (e.g., the communication module 313 (or a communication circuit)) may receive a control signal of the remote controller for controlling the UAV 300. Further, the communication unit may transmit information about a flight state of the UAV 300 to the remote controller.

The power management module 314 may manage power of the UAV 300. According to an embodiment, the power management module 314 may include a power management integrated circuit (PMIC), a charger IC, or a battery (or fuel) gauge. The PMIC may have a wired charging method and/or a wireless charging method. The wireless charging method may include, for example, a magnetic resonance method, a magnetic induction method or an electromagnetic method and may further include an additional circuit for wireless charging, for example, a coil loop, a resonant circuit, a rectifier, or the like. The battery gauge may measure, for example, a remaining capacity of a battery 315 and a voltage, current or temperature thereof while the battery 315 is charged. The battery 315 may include, for example, a rechargeable battery and/or a solar battery.

The imaging device 305 may be mounted on the flight body 301. The imaging device 305 may capture a still image or a moving image. The imaging device 305 may include a camera module 370 for controlling at least one camera 371 and a frame driving unit for controlling direction conversion or the like of the imaging device 305.

The camera module 370 may receive a camera driving signal from the controller included in the flight body 301 and may control the camera 371. The camera module 370 may receive, for example, a video capture start signal, a pause signal, or a stop signal from the controller and may control the camera 371. According to an embodiment, the camera module 370 may be connected to a first connector 332 located on a first printed circuit board (PCB) 310 through a first flexible PCB (FPCB) 334 and may receive a camera driving signal from the AP 311 connected with the first connector 332.

The frame driving unit may control direction conversion or the like of a frame in which a camera is installed. The frame driving unit may include at least one motor 361 for rotating the frame, at least one motor driving circuit 352 for respectively driving the at least one motor 361, and a motor controller (e.g., an MCU 351) for providing a control signal to the at least one motor driving circuit 352. The frame driving unit may convert a direction of the frame by receiving, for example, a pitch up/down signal of a camera frame, a roll left/right signal of the camera frame, or the like and rotating the at least one motor 361. According to an embodiment, part of the motor driving unit may be mounted on a second PCB 350. Further, the motor controller mounted on the second PCB 350 may be connected to a second connector 331 located on the first PCB 310, through a second FPCB 333 and may receive a camera driving signal from the AP 311 connected with the second connector 331. In some embodiments, the frame driving unit may further include a sensor module 353.

Figure 4:
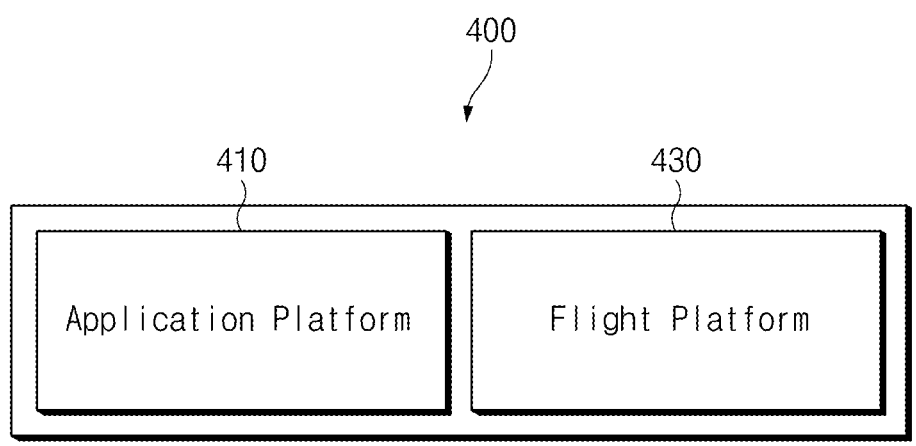
FIG. 4 illustrates a platform of a UAV according to various embodiments of the present disclosure.

FIG. 4 illustrates a platform of a UAV according to various embodiments of the present disclosure.

Referring to FIG. 4, a UAV 400 may include an application platform 410 and a flight platform 430. The application platform 410 may interwork with an electronic device (e.g., a remote controller) for controlling the UAV 400. For example, the application platform 410 may interwork with the remote controller over a communication channel such as long term evolution (LTE). Further, the application platform 410 may process a service such as control of a camera installed in the UAV 400. In some embodiments, the application platform 410 may generate a control signal of the UAV 400 itself through an analysis of camera and sensor data or the like. In the application platform 410, a supportable function or the like may be changed according to a user application. The flight platform 430 may control flight of the UAV 400 depending on a navigation algorithm.

Figure 5A:
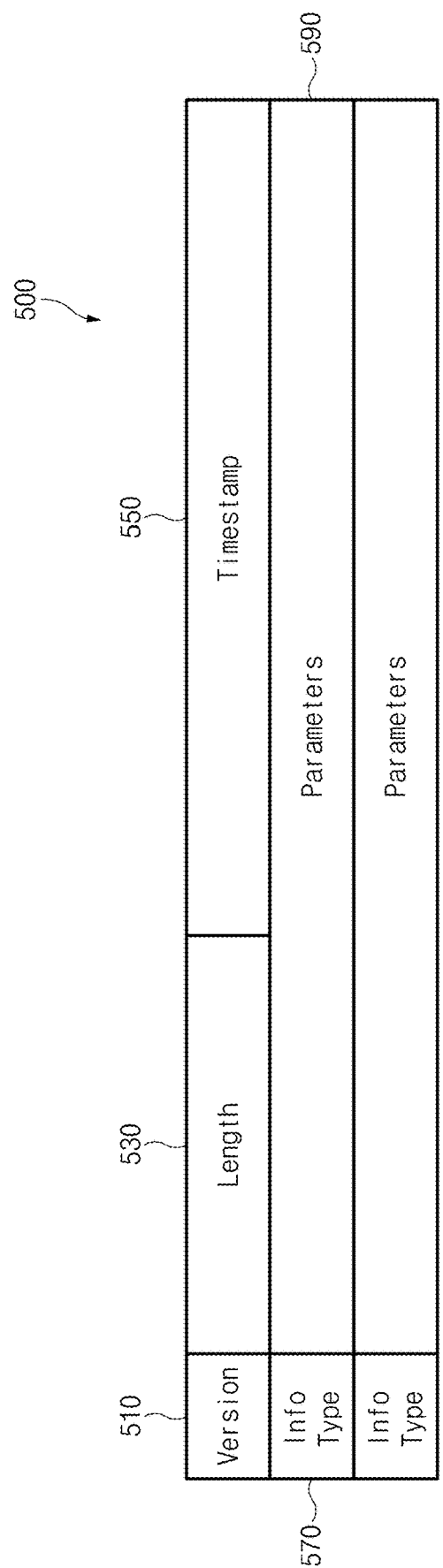
FIG. 5A illustrates a data format of flight information according to various embodiments of the present disclosure.

FIG. 5A illustrates a data format of flight information according to various embodiments of the present disclosure. FIG. 5B illustrates a type of data included in flight information according to various embodiments of the present disclosure.

Referring to FIGS. 5A and 5B, flight information 500 of a UAV may include information about a version of a flight related program, a data length of the flight information 500, information about a time when data included in the flight information 500 is generated, and data about the at least one flight information 500 (e.g., a type 570 of data and a parameter 590). The data about the flight information 500 may include, for example, GPS information 571, inertial measurement information 572, earth magnetic field information 573, atmospheric pressure information 574, sonar information 575, optical flow measurement information 576, attitude information 577, camera driving information 578, and device information 579.

As described above, according to various embodiments, an electronic device (e.g., the electronic device 200) may include a communication circuit (e.g., the communication circuit 250) configured to communicate with an unmanned aerial vehicle (UAV) having a camera, a memory (e.g., the memory 210) configured to store first flight information including a first flight pattern for a first location and first driving information of the camera, the first driving information corresponding to the first flight pattern, and a processor (e.g., the processor 230) configured to be operatively connected with the communication circuit and the memory. The processor may be configured to determine a flight reference location of the UAV, and control the UAV via the communication circuit such that the UAV flies based on the determined flight reference location and the first flight information.

According to various embodiments, the processor may be configured to transmit the determined flight reference location and the first flight information to the UAV via the communication circuit, as at least part of controlling the UAV.

According to various embodiments, the processor may be configured to generate control signal information about the UAV using the determined flight reference location and the first flight information and transmit the control signal information to the UAV via the communication circuit, as at least part of controlling the UAV.

According to various embodiments, the processor may be configured to determine the flight reference location based on a second location of the UAV and the first location, as part of determining the flight reference location. The second location may be a current location of the UAV.

According to various embodiments, the processor may be configured to calibrate the first flight pattern as a second flight pattern to make a detour around the obstacle if an obstacle exists on a flight path of the UAV, calibrate the first driving information as second driving information to correspond to the second flight pattern, and control the UAV via the communication circuit such that the UAV flies based on second flight information including the second flight pattern and the second driving information and the determined flight reference location.

According to various embodiments, the first location may include a relative location for a specified objet.

According to various embodiments, the first flight pattern may include a pattern of control signal information about the UAV.

As described above, according to various embodiments, an electronic device (e.g., the electronic device 200) may include a display (e.g., the display 290), a user interface (e.g., the input interface 270) configured to be detached or integrated with the display, at least one wireless communication circuit (e.g., the communication circuit 250) configured to establish a wireless communication channel with a UAV having a camera, a processor (e.g., the processor 230) configured to be electrically connected with the display, the user interface, and the at least one wireless communication circuit, and a memory (e.g., the memory 210) configured to be electrically connected with the processor. The memory may store instructions, when executed, causing the processor to store at least one or more previously configured flight paths in the memory at least temporarily, establish a wireless communication channel with the UAV using the at least one wireless communication circuit, receive a user input for selecting a flight path of the at least one or more previously configured flight paths through the user interface, receive first geographic data associated with at least one of the electronic device and the UAV using the at least one wireless communication circuit, calibrate the selected flight path based on at least part of the received first geographic data, and transmit information about the calibrated flight path to the UAV over the wireless communication channel.

According to various embodiments, the memory may store instructions, when executed, causing the processor to receive video data associated with second geographic data different from the first geographic data using the at least one wireless communication circuit, output a video on the display based on the video data, receive a user input for selecting the video, and extract the flight path based on at least part of the video data.

According to various embodiments, the memory may further store instructions, when executed, causing the processor to transmit a control signal to the UAV over the wireless communication channel such that the camera faces or tracks a selected object or the electronic device while the UAV moves along the calibrated flight path.

According to various embodiments, the memory may further store instructions, when executed, causing the processor to change at least one of an altitude, a coordinate, or a speed of the selected flight path.

According to various embodiments, the memory may further store instructions, when executed, causing the processor to transmit a signal associated with driving the camera to the UAV over the wireless communication channel based on at least one of direction information, angle of view information, or zoom information of the camera associated with the selected flight path.

According to various embodiments, the at least one of the direction information, the angle of view information, or the zoom information of the camera may be included in metadata of a video corresponding to the selected flight path.

Figure 6:
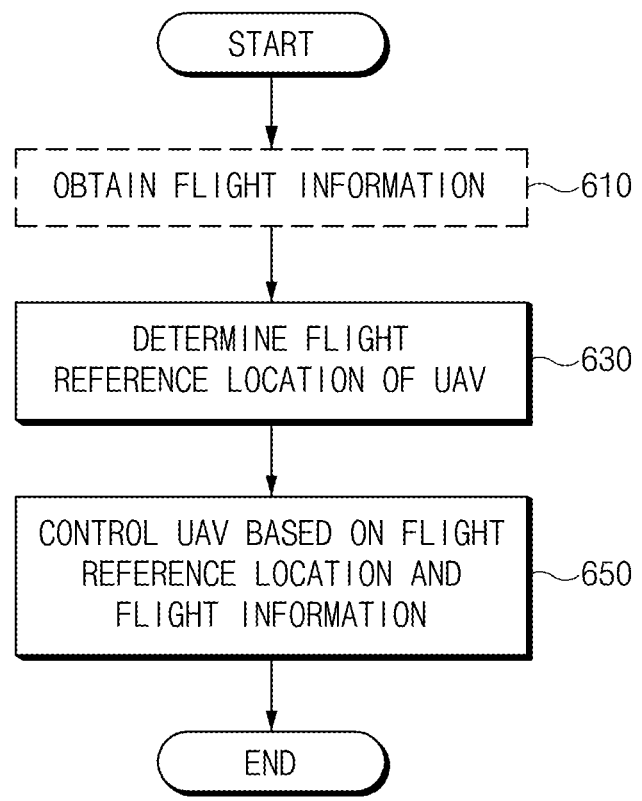
FIG. 6 illustrates a flowchart of an operation method of an electronic device associated with controlling flight of a UAV according to various embodiments of the present disclosure.

FIG. 6 illustrates a flowchart of an operation method of an electronic device associated with controlling flight of a UAV according to various embodiments of the present disclosure.

Referring to FIG. 6, in operation 610, an electronic device (e.g., an electronic device 200 of FIG. 2) may obtain flight information. According to an embodiment, the electronic device may directly obtain flight information from a UAV and may obtain flight information of the UAV from an external electronic device which controls the UAV. In some embodiments, the electronic device may store the obtained flight information in a memory (e.g., a memory 210 of FIG. 2).

In operation 630, the electronic device may determine a flight reference location of the UAV. According to an embodiment, the electronic device may obtain location information of the electronic device or location information of the UAV and may determine the flight reference location of the UAV using the location information of the electronic device or the location information of the UAV together with a flight start point included in the flight information. The flight reference location may be substantially the same location as the flight start point and may be a calibrated location shifted to a specified flight area different from the flight start point. Alternatively, the flight reference location may be a location calculated according to a relative location from a specified subject with respect to the specified subject.

In operation 650, the electronic device may control the UAV based on the flight reference location and the flight information. According to an embodiment, the electronic device may control the UAV such that the UAV flies by substantially the same flight pattern as flight pattern information included in the flight information by using the flight reference location as a flight start point. Further, the electronic device may drive a camera included in the UAV upon the flight to substantially the same as camera driving information included in the flight information.

Figure 7:
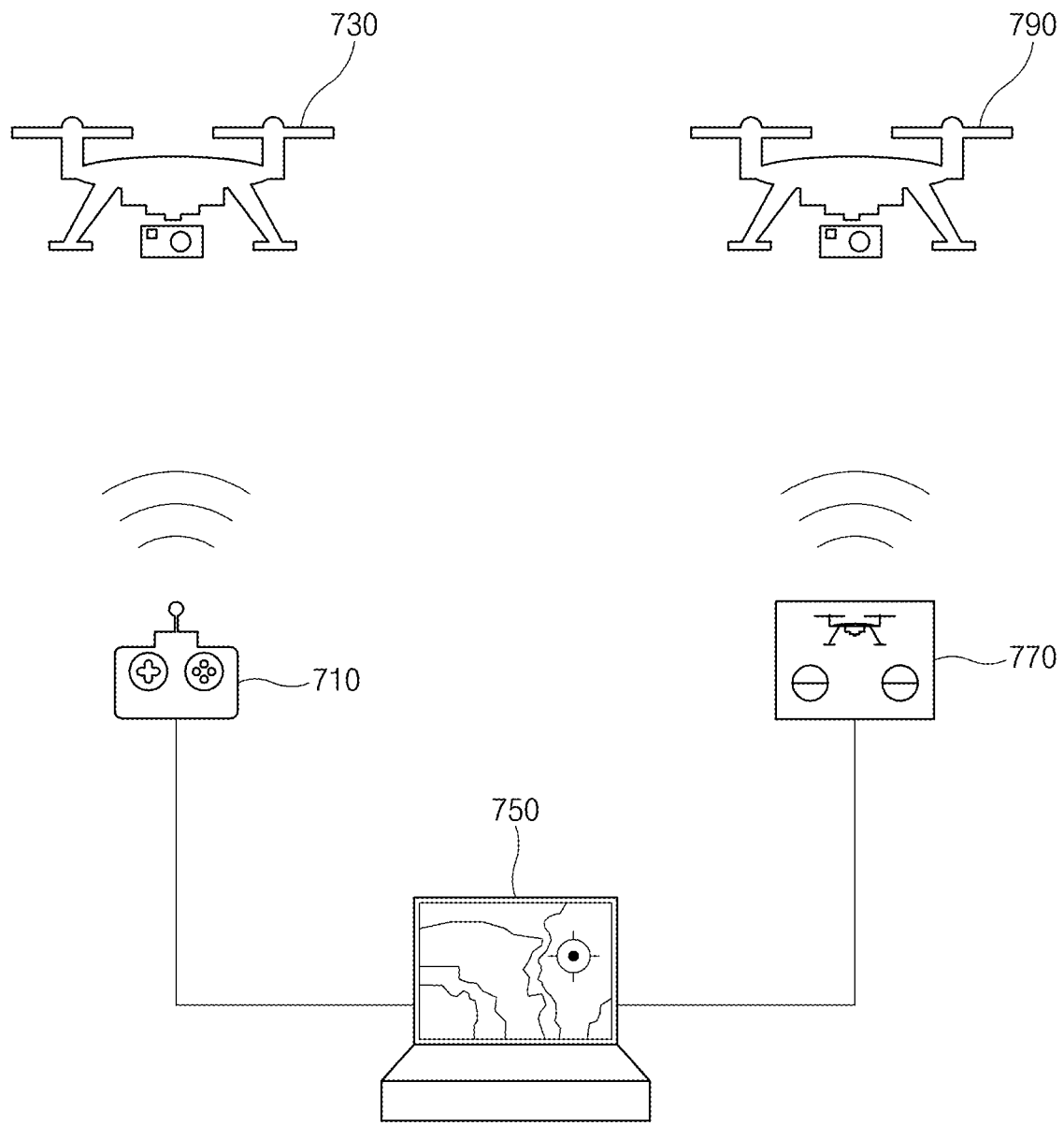
FIG. 7 illustrates a system environment associated with controlling flight of a UAV according to various embodiments of the present disclosure.

FIG. 7 illustrates a system environment associated with controlling flight of a UAV according to various embodiments of the present disclosure.

Referring to FIG. 7, a first UAV controller 710 (or a first electronic device or a first remote controller) may transmit flight information of a first UAV 730 to an external device 750 (or a shared server). The external device 750 may store the flight information of the first UAV 730 and may transmit the flight information of the first UAV 730 to an external electronic device (e.g., a second UAV controller 770 (or a second electronic device or a second remote controller)) by a request of the other external electronic device.

Obtaining the flight information of the first UAV 730, the external electronic device may control flight of a second UAV 790 using the flight information. For example, the external electronic device may control the second UAV 790 such that the second UAV 790 flies by substantially the same flight pattern as the first UAV 730. Further, the external electronic device may drive a camera included in the second UAV 790 to be substantially the same as driving information of a camera included in the first UAV 730 upon the flight.

According to various embodiments, the first UAV controller 710 may directly transmit flight information of the first UAV 730 to the second UAV controller 770 rather than transmitting the flight information of the first UAV 730 to the shared server (e.g., the external device 750).

Figure 8:
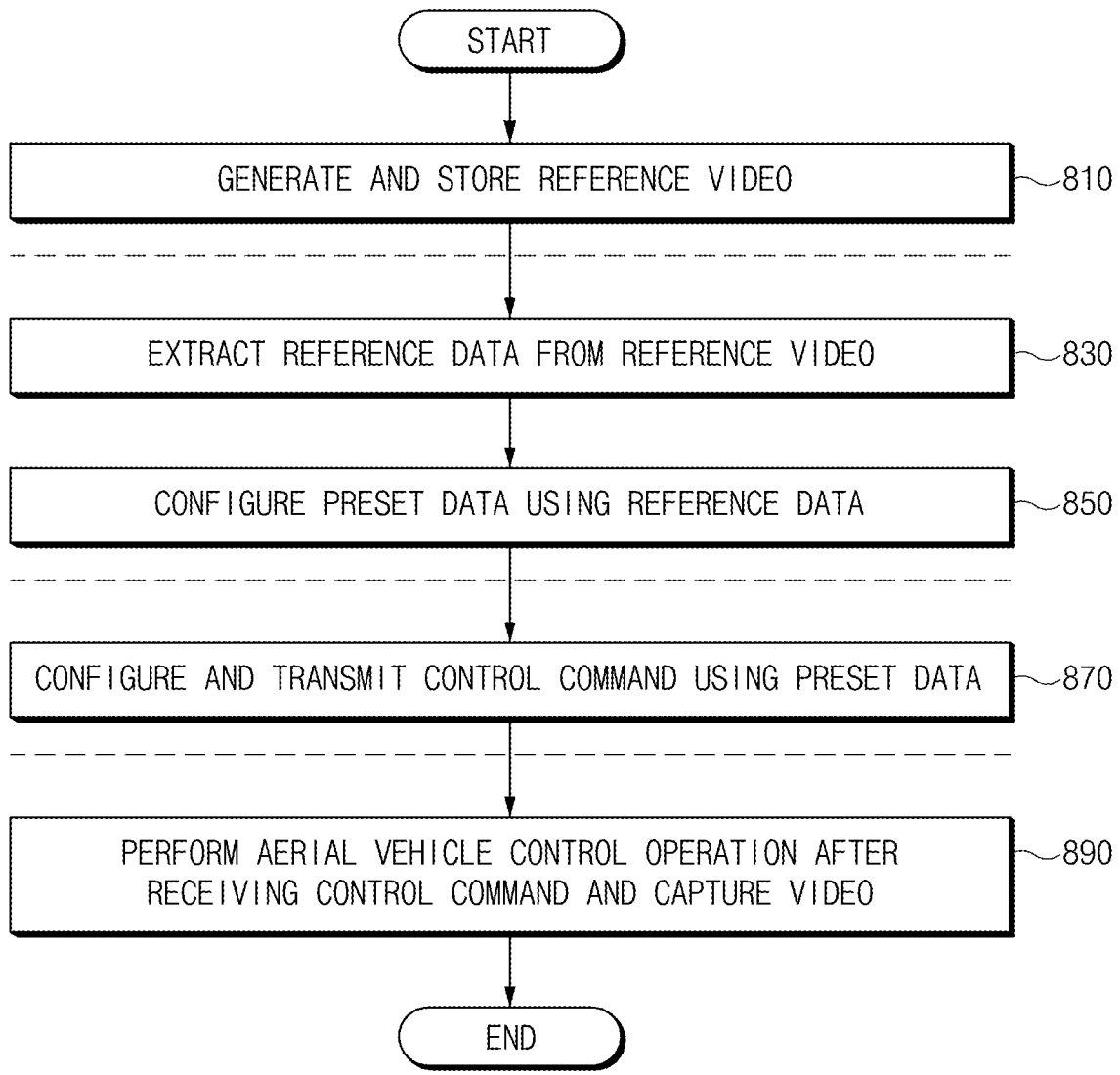
FIG. 8 illustrates a method for configuring and using flight information based on a capture video according to various embodiments of the present disclosure.

FIG. 8 illustrates a drawing illustrating a method for configuring and using flight information based on a capture video according to various embodiments of the present disclosure.

According to an embodiment, flight information of a UAV may be included in a video obtained by a camera installed in the UAV. For example, the flight information of the UAV may be included in metadata of the video. Thus, obtaining the video, an electronic device may extract the flight information from the video.

Referring to FIG. 8, in operation 810, a first electronic device may generate a reference video by including flight information of the first UAV in a video captured by a camera installed in a first UAV. According to an embodiment, the first electronic device may generate the reference video by including data about the flight information of the first UAV in metadata of the captured video. Further, the first electronic device may store the generated reference video in its memory.

In operation 830, the first electronic device may extract reference data from the reference video. The reference data may include, for example, data about flight information of the first UAV, included in metadata of the reference video. For example, the reference data may be data recorded at the time when the first UAV captures a video. For another example, the reference data may be stored and managed together with the video, included in metadata of the captured video and may be managed as data (e.g., a file) independent of the captured video. In some embodiments, the reference data may fail to be data recorded at the time when the first UAV captures a video. For example, the reference data may be data extracted by analyzing the capture video after the video is captured.

In operation 850, the first electronic device may configure preset data using the reference data. The preset data may be integrated data of flight information generated based on data about flight information of the first UAV. The preset data may be data converted into a format standardized to be available in another electronic device. The preset data may have the same data format as the reference data or may be generated in the form of converting the reference data. In some embodiments, the preset data may be data in the form of being transformed by configuration information of a user or may be data newly generated based on the configuration information of the user.

In operation 870, the first electronic device may configure a control command (or signal) to control flight of a second UAV using the preset data. Alternatively, the first electronic device may transmit the configured control command to the second UAV. The control command may include a flight control signal corresponding to flight pattern information of the second UAV and a camera control signal corresponding to driving information of a camera installed the second UAV.

In operation 890, receiving the control command, the second UAV may perform an aerial vehicle control operation depending on the control command and may capture a video.

According to various embodiments, operations 830 to 870 may be performed by a second electronic device, which receives the reference video from the first electronic device, rather than the first electronic device. Alternatively, the first electronic device may register the reference video in a shared server, and the second electronic device may obtain the reference video from the shared server and may perform operations 830 to 870. In some embodiments, in operations 870 and 890, a function of the first UAV rather than the second UAV may be performed.

Figure 9:
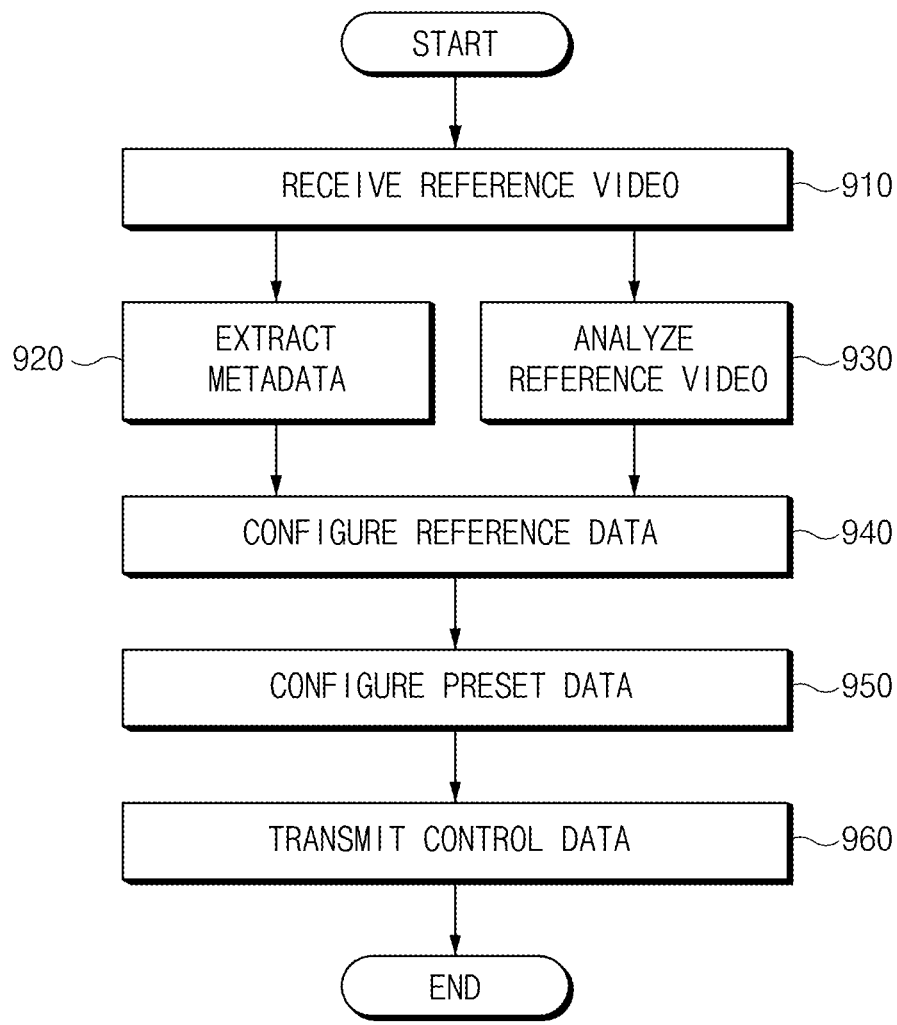
FIG. 9 illustrates a flowchart of a method for extracting and using flight information based on a capture video according to various embodiments of the present disclosure.

FIG. 9 illustrates a flowchart of a method for extracting and using flight information based on a capture video according to various embodiments of the present disclosure.

Referring to FIG. 9, in operation 910, an electronic device may receive a reference video. Further, in operations 920 and 930, the electronic device may extract metadata from the reference video and may analyze the reference video. In an embodiment, operations 920 and 930 may be performed at substantially the same time and may sequentially be performed.

In operation 940, the electronic device may configure reference data using the extracted metadata. The reference data may include, for example, data about flight information of a UAV.

In operation 950, the electronic device may configure preset data. According to an embodiment, the electronic device may integrate data about flight information of the UAV to configure preset data to be similar to as being shown in FIG. 5A.

In operation 960, the electronic device may transmit control data (or a control command (signal)) associated with flight control to the UAV. According to an embodiment, the electronic device may generate a control signal associated with flight of the UAV based on the preset data and may transmit the generated control signal to the UAV.

According to an embodiment, an operation of configuring the preset data from the reference video may be performed by an external device (e.g., a personal computer (PC)) which is not directly related to an operation of the UAV. Further, controlling the UAV, an electronic device (e.g., a dedicated controller or a portable terminal) may receive the preset data from the external electronic device and may transmit a control signal to the UAV based on the preset data. In some embodiment, the preset data configured from the reference video may be directly transmitted to the UAV, and the UAV may directly generate a control signal.

Figure 10:
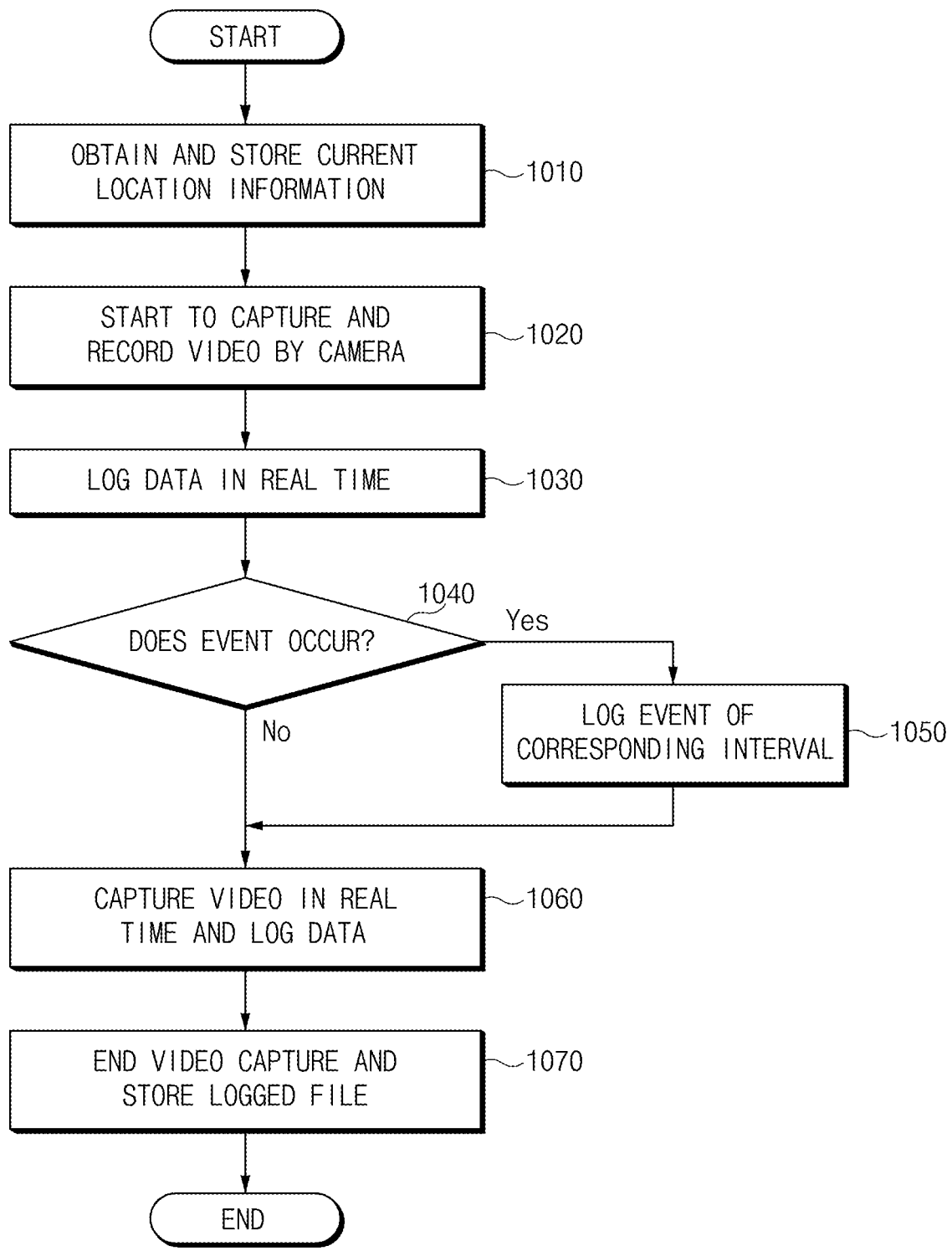
FIG. 10 illustrates a flowchart of a method for configuring flight information based on a capture video according to various embodiments of the present disclosure.

FIG. 10 illustrates a flowchart of a method for configuring flight information based on a capture video according to various embodiments of the present disclosure.

Referring to FIG. 10, in operation 1010, an electronic device may obtain current location information of a UAV and may store the obtained location information in its memory. In operation 1020, the electronic device may start to capture and record a video by a camera installed in the UAV. For example, the electronic device may transmit a driving signal for video capture of the camera to the UAV, may continuously receive the video captured by the camera, and may store the received video in the memory.

In operation 1030, the electronic device may record (or log) data received in real time from the UAV. According to an embodiment, the electronic device may store a coordinate, a time, sensing data, or the like of the UAV in the memory in real time.

In operation 1040, the electronic device may determine whether an event occurs. The event may indicate a change in state, for example, a speed of the UAV is changed or if an angle of view of a camera installed in the UAV is changed.

If the event occurs, in operation 1050, the electronic device may record (or log) an event of a corresponding interval. For example, the electronic device may store information, corresponding to a location movement of the UAV, a change in an altitude of the UAV, a change in a speed of the UAV, a change in an angle of view of the camera, or the like, together with a time when the event occurs in the memory.

In operation 1060, the electronic device may capture a video in real time and may record (or log) data using the camera. For example, if the event is ended or if the event does not occur, the electronic device may continuously record a video and may store a coordinate, a time, sensing data, or the like of the UAV in the memory.

In operation 1070, the electronic device may end the video capture and may store a logging file in the memory. For example, the electronic device may end the video capture and may store a logged file in the memory through an operation of a user, for example, if the user selects a video capture stop button or if the UAV makes a landing.

The logged file may correspond to flight information of the UAV. In some embodiments, the electronic device may include logging data included in the logged file in metadata of a capture video.

According to various embodiments, operations 1010 to 1070 may be performed by the UAV. In this case, the UAV may transmit the capture video and the logging file (or flight information) generated as a result to an electronic device which controls the UAV.

Figure 11:
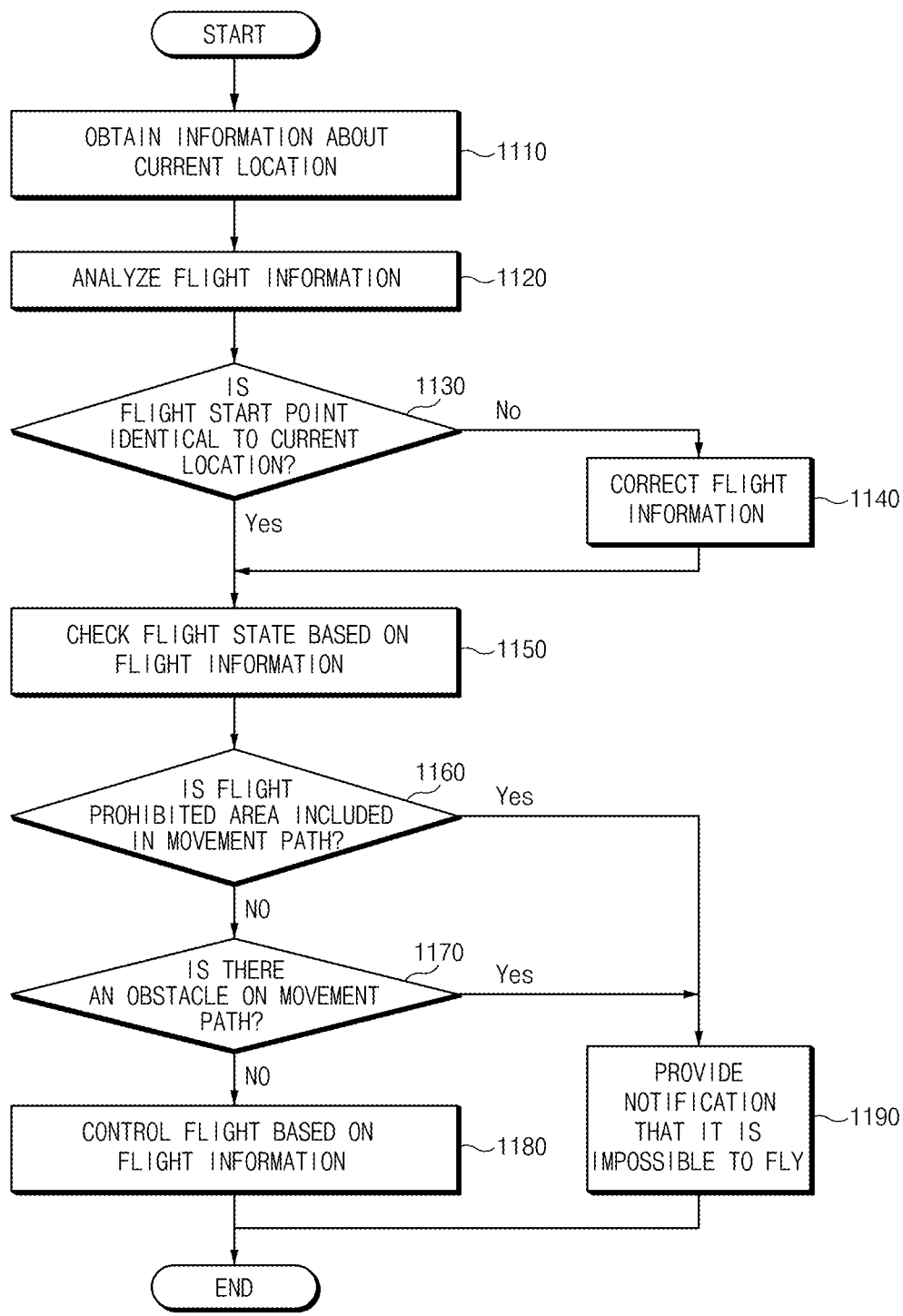
FIG. 11 illustrates a flowchart of a method for controlling flight of a UAV based on obtained flight information according to various embodiments of the present disclosure.

FIG. 11 illustrates a flowchart illustrating a method for controlling flight of a UAV based on obtained flight information according to various embodiments of the present disclosure.

Referring to FIG. 11, in operation 1110, an electronic device may obtain information about a current location of the UAV. Further, in operation 1120, the electronic device may analyze flight information. The flight information may be included in a capture video and may be generated as a file independent of the capture video. Further, as shown in FIG.

10, the flight information may be generated by an electronic device which controls a UAV, and may be generated by the UAV and may be transmitted to the electronic device.

In operation 1130, the electronic device may determine whether a flight start point included in the flight information is identical to the current location. According to an embodiment, the electronic device may determine whether a coordinate area corresponding to the flight start point is identical to a coordinate area indicating the current location.

If the flight start point included in the flight information is not identical to the current location, in operation 1140, the electronic device may calibrate the flight information. For example, the electronic device may locate the UAV to capture a video on a specific point and may perform flight of the UAV by using the specific point as a flight start location. In this case, the electronic device may calibrate the flight information such that the specific point is the flight start point. For example, the electronic device may calibrate location values of the UAV, included in the flight information, as a difference value between the specific point and a flight start point included in the flight information.

In operation 1150, the electronic device may check a flight state of the UAV based on the flight information. For example, the electronic device may determine a movement path where the UAV will really fly, through location values of the UAV, which is included in the flight information or is calibrated.

In operation 1160, the electronic device may determine whether the movement path is included in a flight prohibited area (or a flight restricted area). According to an embodiment, the electronic device may receive map data from an external server and may determine whether the movement path is included in the flight prohibited area included in the map data.

If the movement path is included in the flight prohibited area, in operation 1190, the electronic device may inform a user that it is impossible to fly. For example, the electronic device may output a display object, for informing the user that it is impossible to fly using the movement path, on its display.

If the movement path is not included in the flight prohibited area, in operation 1170, the electronic device may determine whether there is an obstacle on the movement path. For example, the electronic device may determine whether a feature included in the map data is an obstacle on the movement path. If there is the obstacle on the movement path, the electronic device may perform operation 1190.

If there is no the obstacle on the movement path, in operation 1180, the electronic device may control flight of the UAV based on the flight information.

Figure 12A:
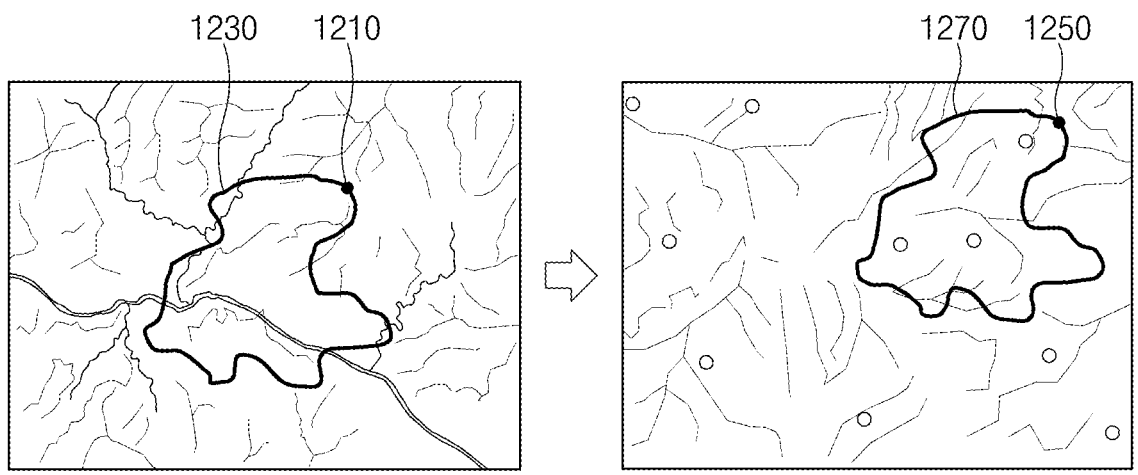
FIG. 12A illustrates a screen of flight using absolute location information of a UAV, included in flight information, according to various embodiments of the present disclosure.
Figure 12B:
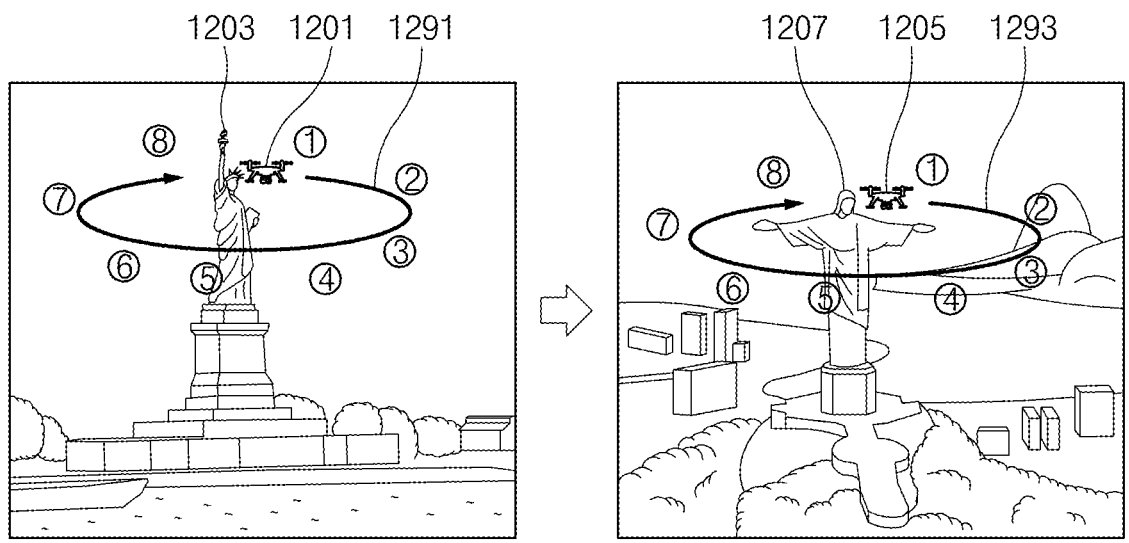
FIG. 12B illustrates another screen of flight using absolute location information of a UAV, included in flight information, according to various embodiments of the present disclosure.

FIG. 12A illustrates a screen of flight using absolute location information of a UAV, included in flight information, according to various embodiments of the present disclosure. FIG. 12B illustrates a drawing illustrating another screen of flight using absolute location information of a UAV, included in flight information, according to various embodiments of the present disclosure.

According to an embodiment, the UAV may capture a video and may include location and attitude information corresponding to its flight path in metadata of the video. In this case, the included location information of the UAV may include three-dimensional (3D) location information, for example, absolute location information such as latitude, longitude, and altitude information. The metadata of the video may include direction information, angle of view information, zoom information, or the like of a camera installed in the UAV.

According to an embodiment, latitude and longitude information of the UAV may be obtained through a global positioning system (GPS) or the like and may be obtained using a positioning system which uses a mobile network. Further, the latitude and longitude information of the UAV may be obtained by a fingerprint scheme using strength of a signal such as wireless-fidelity (Wi-Fi).

According to an embodiment, altitude information of the UAV may be calculated based on atmospheric pressure information obtained through an atmospheric pressure sensor included in the UAV. For another example, the altitude information of the UAV may be determined through an infrared sensor, an ultrasonic sensor, a GPS, or the like included in the UAV.

According to an embodiment, attitude information of the UAV may be obtained through an embedded sensor, such as an acceleration sensor or a gravity sensor included in the UAV.

According to an embodiment, a coordinate and altitude of a movement path of the UAV may be determined using location information of the UAV. Further, a direction, image quality, effect, or the like where a camera captures a video during flight may be set in the same manner using driving information of the camera. A movement speed, a movement direction, or the like may be controlled through attitude and movement information of the UAV to obtain the same video.

According to an embodiment, location and attitude information of the UAV may be obtained and stored at intervals of a predetermined time preset by a user. According to another embodiment, the location and attitude information of the UAV may be stored on a frame-by-frame basis in a stored video. The location and attitude information of the UAV may be synchronized with a storage frame of a video and may be store per predetermined frame.

According to an embodiment, intervals of a time when the location and attitude information of the UAV is stored may be variably set in response to a speed of the UAV, an amount of variation in capture video, or an amount of variation in attitude. For example, if a speed of the UAV is fast, if a change in data in a capture video rapidly occurs, or if an attitude of the UAV is rapidly changed, an interval where information is stored is set to be narrow and a large amount of information may be stored. If a speed of the UAV is slow or if an attitude is stable, an interval where information is stored is set to be broad and a relatively small amount of information may be stored.

According to an embodiment, location and attitude information of the UAV, obtained during video capture, may fail to be included in metadata of a video and may be stored as an independent file different from a video file.

According to an embodiment, an electronic device may obtain a video of the same composition in the same location as a reference video for extracting flight information (e.g., preset data) using an absolute movement path of the UAV and the flight information including sensing data obtained based on a sensor module included in the UAV.

According to an embodiment, the absolute movement path of the UAV and the flight information including the sensing data may be calibrated according to a change in video capture place and may be used as operation data of the UAV in a new place. For example, as shown in FIG. 12A, the electronic device may reconstruct substantially the same flight pattern 1270 as a flight pattern 1230 of the UAV operated to capture a reference video in a first location (e.g., the Grand Canyon), in a second location 1250 (e.g., Mt. Bukhan).

According to another embodiment, as shown in FIG. 12B, if the electronic device stores a reference video in which the Statue of Liberty 1203 is captured by a predetermined flight pattern 1291 through a UAV 1201, the electronic device or another electronic device which obtains the reference video may control the UAV 1201 or another UAV 1205 such that the UAV 1201 or the other UAV 1205 flies and captures Statue of Christ Redeemer 1207 by substantially the same flight pattern 1293 as the flight pattern 1291. In this case, the electronic device may simplify and calibrate a flight path (or a flight pattern) of the UAV using a plurality of points. For example, as shown in 12B, the electronic device may calibrate the flight path using information about 8 points representing the flight path.

Figure 13:
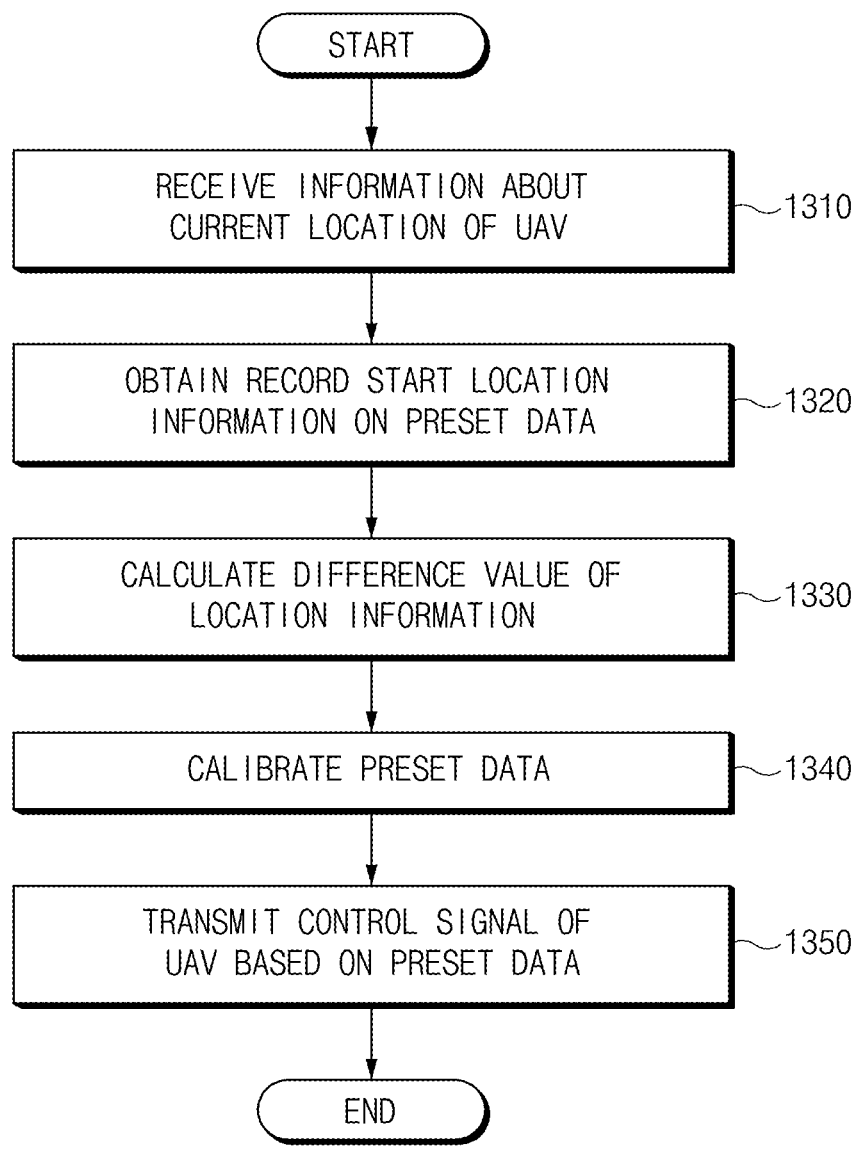
FIG. 13 illustrates a flowchart of a method for using absolute location information of a UAV, included in flight information, according to various embodiments of the present disclosure.

FIG. 13 illustrates a flowchart of a method for using absolute location information of a UAV, included in flight information, according to an embodiment.

Referring to FIG. 13, in operation 1310, an electronic device may receive information about a current location of the UAV. For example, the electronic device may receive latitude, longitude, and altitude information of the UAV, measured through a GPS or an altitude sensor included in the UAV. For another example, the electronic device may receive attitude information measured through an acceleration sensor, a gravity sensor, or the like included in the UAV.

In operation 1320, the electronic device may obtain record (or video capture) start location information on previously obtained preset data. For example, the electronic device may extract record start location information or flight start location information included in the preset data.

In operation 1330, the electronic device may calculate a difference value between the current location information of the UAV and record start location information or flight start location information included in the preset data. According to an embodiment, the electronic device may calculate a difference value between latitude, longitude, and altitude information corresponding to the current location of the UAV and latitude, longitude, and altitude information corresponding to a record start location or a flight start location included in the preset data.

In operation 1340, the electronic device may calibrate the preset data based on the difference value between the current location information and the record start location information or the flight start location information. According to an embodiment, the electronic device may calibrate a flight path of the UAV, calculated based on the preset data, using the difference value between the latitude, longitude, and altitude information and the latitude, longitude, and altitude information. In this case, the electronic device may calibrate location information about a plurality of points representing the flight path using the difference value.

In operation 1350, the electronic device may transmit a control signal to the UAV based on the calibrated preset data. For example, the electronic device may generate a control signal such that the UAV flies using the calibrated flight path and may transmit the generated control signal to the UAV.

According to an embodiment, the operation of calibrating the preset data may be performed by an electronic device which controls the UAV and may be performed by an electronic device of a third party, which is not related to the UAV, and may be performed by another electronic device connected with the electronic device. According to another embodiment, the operation of calibrating the preset data may be performed in the UAV.

According to an embodiment, if the UAV varies in weight, thrust, control change value, or the like, flight control using the preset data may vary for each UAV. Thus, when the preset data is generated, basic information (e.g., a weight, thrust, or the like) of the UAV may be stored together with the preset data. A control signal of the UAV according to each change value may differently generated using basic information of the electronic device. For example, if preset data generated in response to a video captured by a UAV with a maximum speed of 20 m/s is used in another UAV with a maximum speed of 10 m/s, the electronic device may calibrate the preset data using a rate value of the maximum speeds and may control flight of the UAV.

Figure 14A:
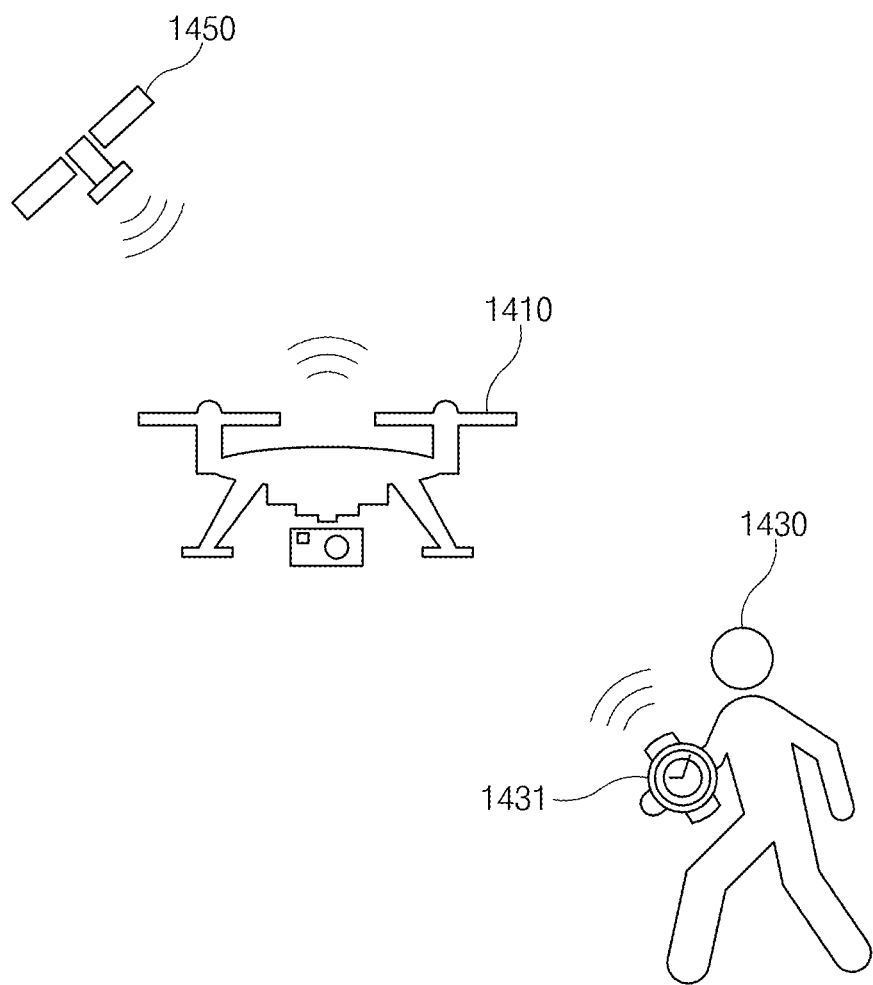
FIG. 14A illustrates a method for setting relative location information of a UAV according to various embodiments of the present disclosure.
Figure 14B:
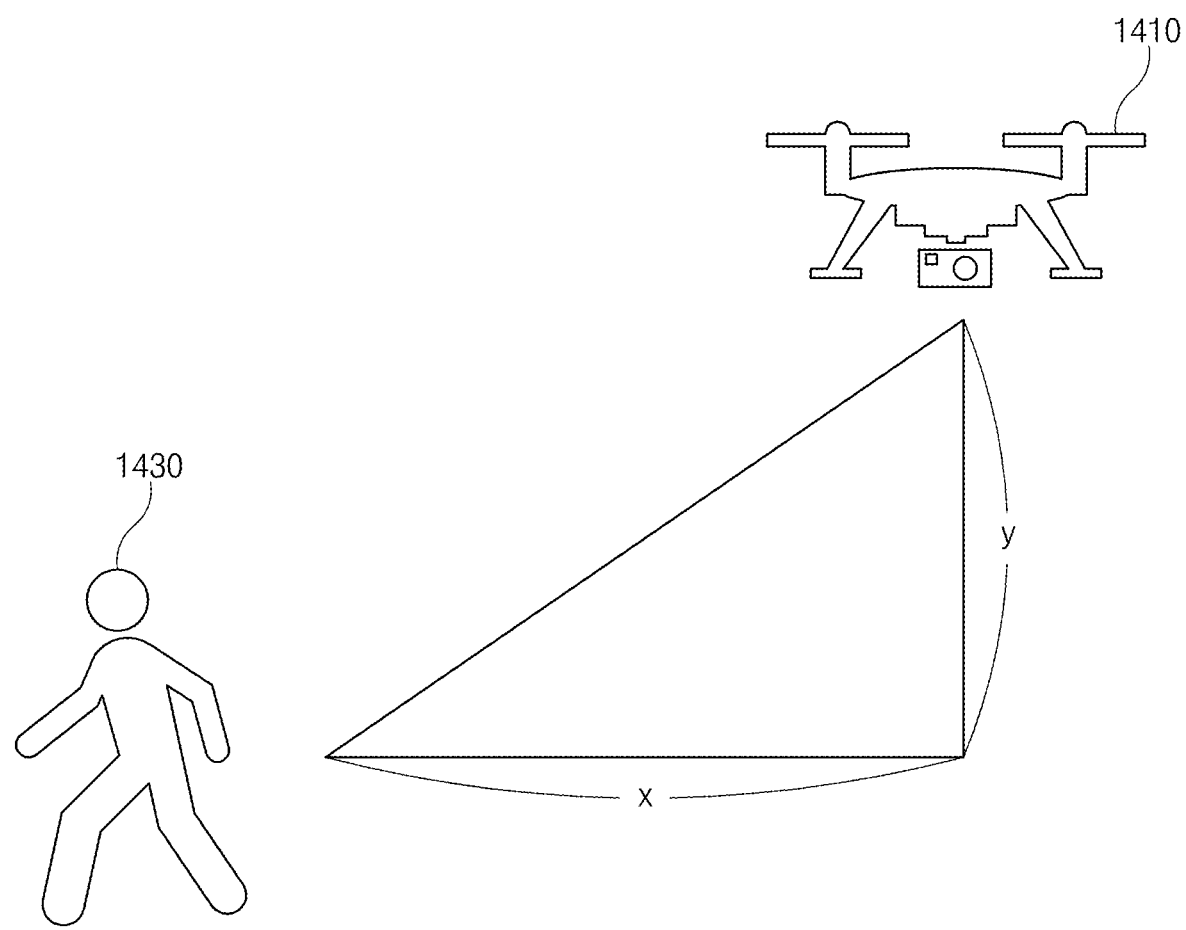
FIG. 14B illustrates another method for setting relative location information of a UAV according to various embodiments of the present disclosure.
Figure 14C:
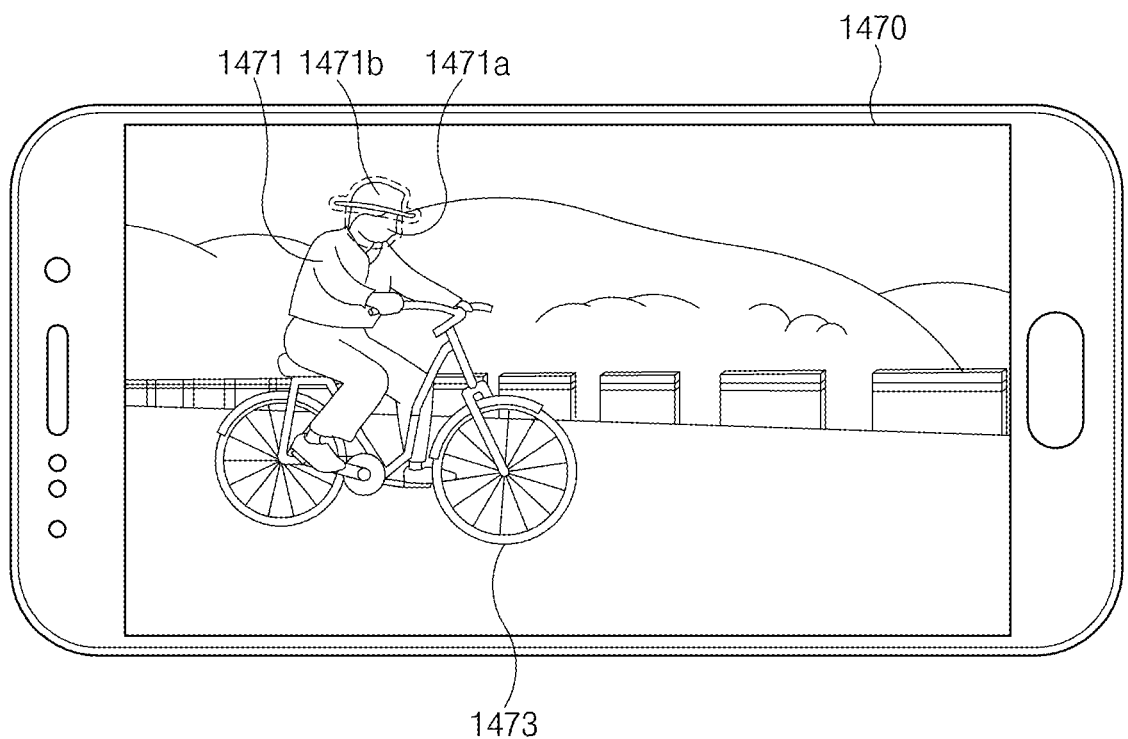
FIG. 14C illustrates a screen to support to select a subject according to various embodiments of the present disclosure.

FIG. 14A illustrates a method for setting relative location information of a UAV according to various embodiments of the present disclosure. FIG. 14B is a drawing illustrating another method for setting relative location information of a UAV according to an embodiment. FIG. 14C is a drawing illustrating a screen to support to select a subject according to an embodiment.

According to an embodiment, a UAV 1410 may capture a video and may include location and altitude information corresponding to its flight path in metadata of the video. In this case, the included location information of the UAV 1410 may include relative 3D location information relative to an electronic device 1431, which controls the UAV 1410, and a specified subject (e.g., a user 1430). For example, the location information of the UAV 1410 may include information about a latitude difference, a longitude difference, and an altitude difference corresponding to a separation distance from an object which is a criterion. In some embodiments, altitude information of the UAV 1410 may be set to information about an angle difference seen from the object which is the criterion. Further, metadata of a video may include direction information, angle of view information, zoom information, or the like of a camera installed in the UAV.

According to an embodiment, relative location information of the UAV 1410 may be obtained through a GPS 1450. For another example, the relative location information of the UAV 1410 may be obtained using a positioning system which uses a mobile network. For another example, the relative location information of the UAV 1410 may be determined using latitude and longitude information of the UAV 1410, obtained by a fingerprint scheme which uses strength of a wireless network signal such as a Wi-Fi signal. In some embodiments, the relative location information of the UAV 1410 may be determined using sensing information or the like obtained through an infrared sensor, a radar device (e.g., a light detection and ranging (LiDAR)), and the like included in the UAV 1410 and the electronic device 1431 set to a criterion. If such relative location information is used, a consistent (fixed or inherent) positioning error of a positioning system such as the GPS 1450 may be offset, and more accurate positioning than an absolute coordinate may be performed.

Referring to FIG. 14A, the UAV 1410 or the electronic device 1431 which is a criterion may generate relative location information of the UAV 1410 using GPS receiving information obtained from the UAV 1410 and the electronic device 1431. Further, the UAV 1410 or the electronic device 1431 may accumulate and record a GPS movement path of each of the moving UAV 1410 and the electronic device 1431 and may generate relative location information of the UAV 1410 by calculating a difference value between GPS receiving information corresponding to GPS movement paths, thus configuring preset data based on the generated relative location information of the UAV 1410.

While an electronic device (e.g., the electronic device 1431) which obtains the preset data moves the UAV 1410 to a relative location from the electronic device 1431 which is the criterion based on relative location information of the UAV 1410, it may capture a video. Further, the electronic device may calibrate the preset data such that the UAV 1410 flies and captures a video while maintaining a relative location with respect to a specified subject. For example, if the preset data includes relative location information of the UAV 1410 with respect to a first subject, the electronic device may calibrate the preset data to maintain a relative location with respect to a second subject.

According to an embodiment, as shown in FIG. 14C, the electronic device 1431 may provide a screen for selecting a subject 1430 from a video 1470 captured by its camera, such that, as shown in FIG. 14B, the UAV 1410 maintains a relative location relative to the specified subject 1430. If the electronic device 1431 displays the capture video 1470 on a screen, a user may select any one of objects included in the capture video 1470. For example, if the capture video 1470 is a video in which a person who rides a bicycle is captured, the user may select any one of a first object 1471 corresponding to the person or a second object 1473 corresponding to the bicycle. For another example, if the capture video 1470 is a video in which a person who wears a hat is captured, the user may select any one of a third object 1471a corresponding to a face of the person or a fourth object 1471b corresponding to the hat.

In this case, the electronic device 1431 may select the object selected by the user as the subject 1430 and may recognize the selected object through object recognition (or face recognition). The electronic device 1431 may detect a relative location value for the UAV 1410 and the recognized object as a change in a relative size of the selected object and may configure preset data using the relative location value. The change in the relative size of the selected object may include a change in a size of a pixel of a region occupied by the selected object (or a variation value of the pixel), a change in a region ratio of the entire screen to an object, or the like. In this regard, information included in the capture video 1470 may include location information of an object included in a video (e.g., a rate of the object based on a coordinate or a rate of a horizontal/vertical screen of the video), size information of the object, or the like. The location information may include information associated with a central point of an object, an edge of the object, and/or the like. According to an embodiment, information included in the capture video 1470 may include location information and size information about a plurality of objects. For example, if an object is a person, the information may include location information of a body of the person (e.g., a coordinate of the body in a video) and size information of the body. The body may be, for example, a face of the person. Further, the body may be a face of the person or may be part or all of the body including the face.

The electronic device 1431 may control the UAV 1410 to maintain a relative location from the object based on preset data configured using a relative location value for the object. For example, the electronic device 1431 may accumulate and record a change (e.g., a pixel variation value) of a relative size of the object (e.g., the specified object 1430) on a screen corresponding to the capture video 1470 and may configure the preset data with respect to a pixel location and size of the capture video 1470. In this case, obtaining the preset data, the electronic device 1431 or another electronic device may control the UAV 1410 such that the UAV 1410 flies while tracking the specified subject 1430 based on the preset data. According to an embodiment, when storing the relative location information, the electronic device 1431 may change a relative coordinate through a GPS, size information of a pixel, or the like at a specific time in a different way depending on a video capture intention to configure a capture video.

Figure 15:
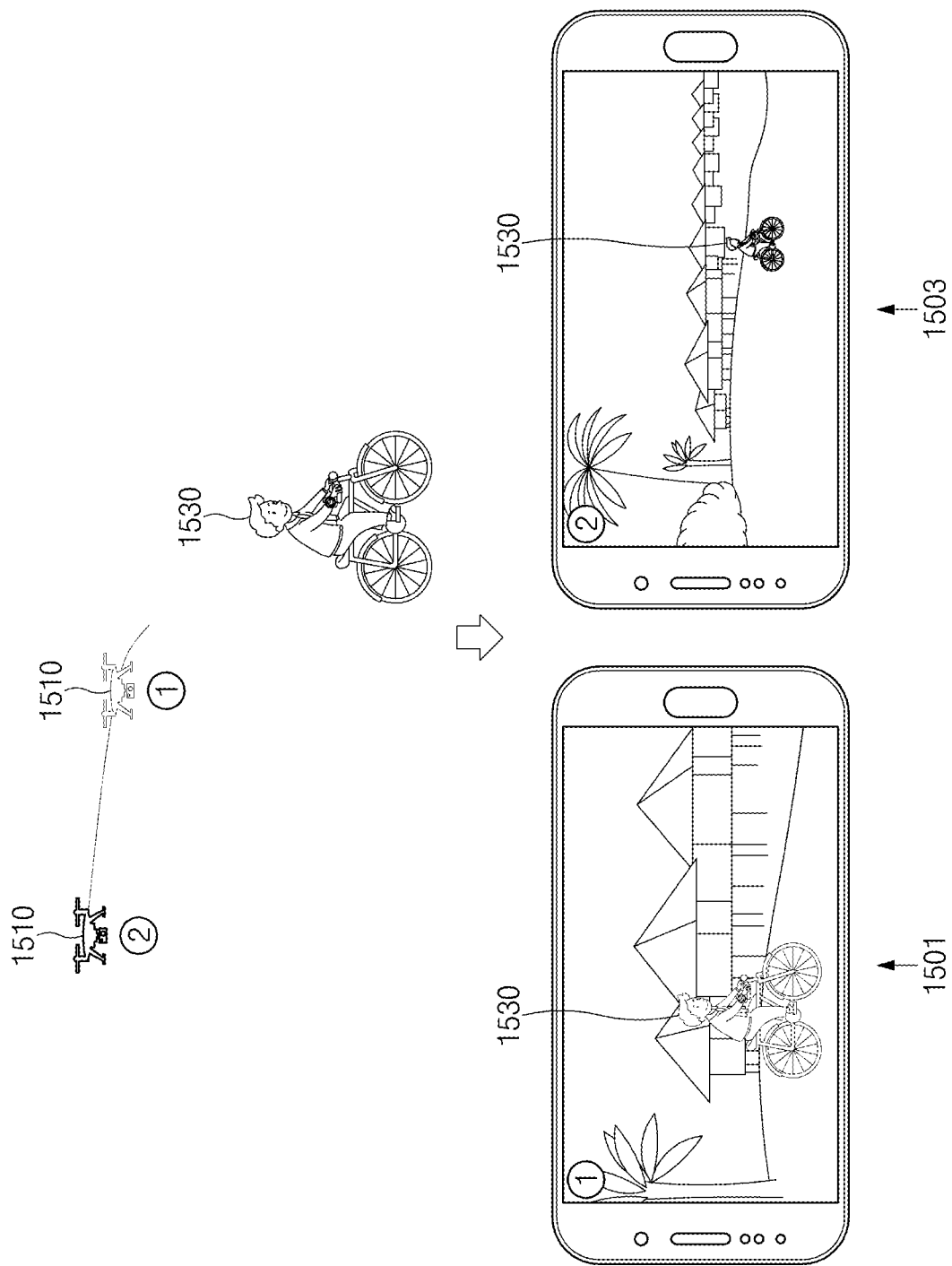
FIG. 15 illustrates a screen of flight using relative location information of a UAV, included in flight information, according to various embodiments of the present disclosure.

FIG. 15 illustrates a screen of flight using relative location information of a UAV, included in flight information, according to various embodiments of the present disclosure.

According to an embodiment, if using relative location information of a UAV 1510, an electronic device may control the UAV 1510 such that the UAV 1510 flies and captures a video while always maintaining a predetermined distance from a specified subject 1530. However, the electronic device may control the UAV 1510 such that the UAV 1510 flies and capture a video while changing a relative location from the specified subject 1530.

Referring to FIG. 15, when making a reference video, the electronic device may configure preset data to have information about a flight pattern that, for example, the UAV 1510 is distant or rotates at various angles from the specified subject 1530 and have video capture information. For example, the electronic device may capture a video while moving the UAV 1510 by the same video capture composition as the reference video. Further, the electronic device may control the UAV 1510 such that the UAV 1510 moves to a second location in a second state 1503 while capturing the subject 1530 in a first location in a first state 1501 and captures the subject 1530 by another video capture composition.

According to an embodiment, the electronic device may generate and use new information using location information and attitude change information according to a time when reference data is obtained from the reference video. For example, the electronic device may convert and use GPS location information on reference data into information about a relative distance from the specified subject 1530 through an operation of setting the specified subject 1530 in the reference video. In video capture composition in which the information about the relative location from the specified subject 1530 rather than absolute location information of the UAV 1530 is important through such a conversion process, more active video capture may be performed using the UAV 1510. In some embodiments, the electronic device may obtain relative location information of the UAV 1510 with respect to an electronic device which emits a specific wireless signal rather than the specified subject 1530.

According to an embodiment, the electronic device may connect with a specific portion of a subject who wants to capture part of a specific object included in the reference video to generate relative location information of the UAV 1510. For example, the electronic device may connect a hat of a specific color worn by a person which is a subject included in the reference video with clothes of a person which is a subject to be captured to generate relative location information of the UAV 1510.

According to an embodiment, after moving the UAV 1510 to capture a video to a specific point, for example, a video capture start point, the electronic device may control flight of the UAV 1510 using preset data. In this case, before transmitting a control signal generated based on the preset data to the UAV 1510, the electronic device may calibrate the preset data. For example, the electronic device may calibrate a video capture start point or a flight start point included in the preset data based on a specific point selected by a user. For example, if a video capture start altitude of a video included in the preset data is set to 10 m and if the user selects an altitude as a video capture start location of 14 m, the electronic device may calibrate location information included in the preset data as the video capture start location.

According to an embodiment, if it is impossible for the UAV 1510 to capture a video through such calibration, the electronic device may inform the user that it is impossible to capture a video. For example, if a video capture start altitude of a video included in the preset data is set to 10 m and if an altitude of the UAV 1510 is moved to 3 m while a video is captured, if the user selects an altitude as a video capture start location of less than 7 m, since it is possible for a risk that the UAV 1510 will collide with the ground to occur, the electronic device may generate a risk signal before video capture is started and inform the user of the risk.

Figure 16:
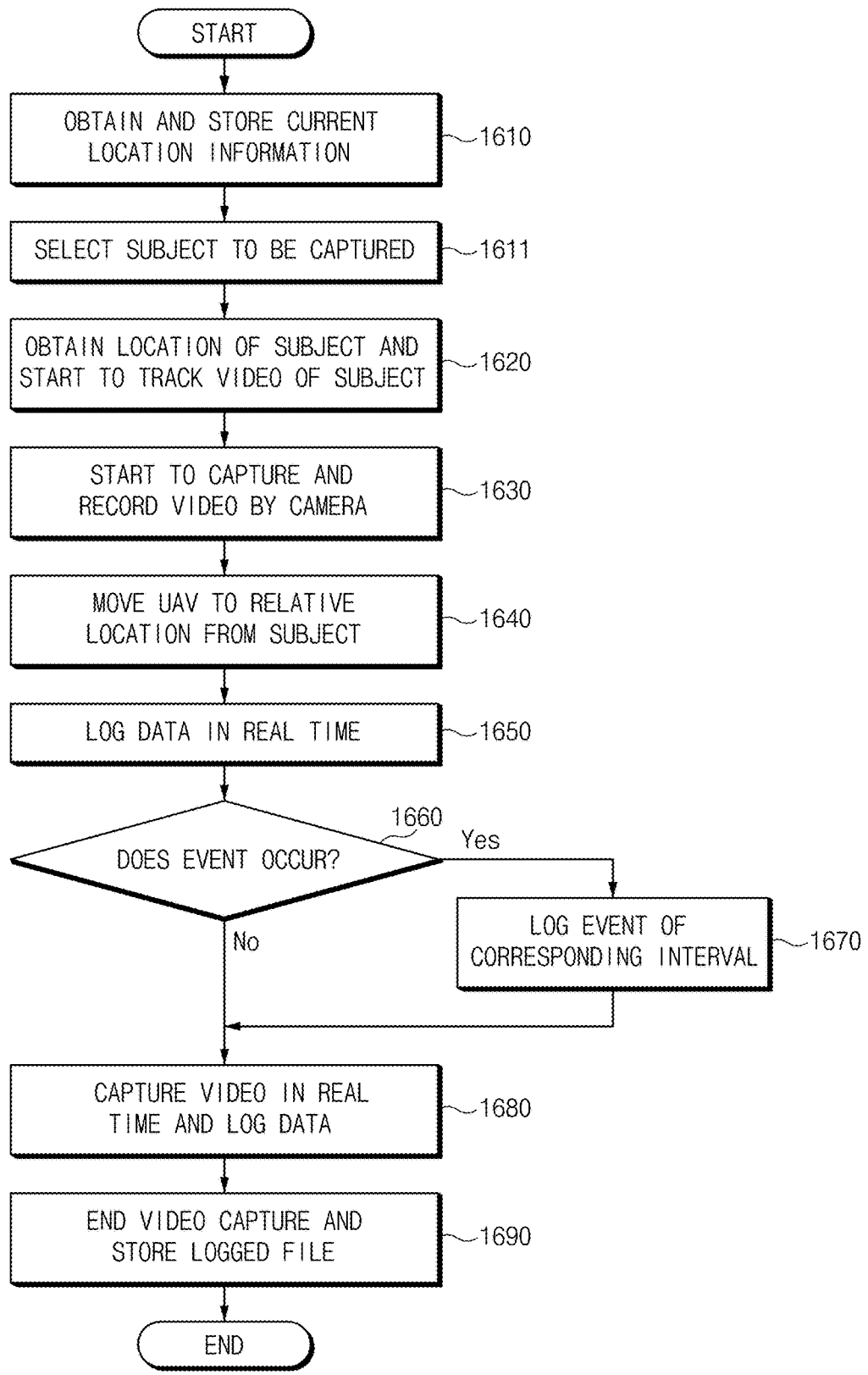
FIG. 16 illustrates a flowchart of a method for configuring flight information using relative location information of a UAV according to various embodiments of the present disclosure.

FIG. 16 illustrates a flowchart of a method for configuring flight information using relative location information of a UAV according to various embodiments of the present disclosure.

Referring to FIG. 16, in operation 1610, an electronic device may obtain current location information of the UAV and may store the obtained current location information in its memory. According to an embodiment, the electronic device may obtain the current location information of the UAV through a GPS, a positioning system using a mobile network, a fingerprint scheme, or the like.

In operation 1611, the electronic device may select a subject to be selected. For example, the electronic device may output a video (e.g., a preview video) to be captured by a camera installed in the UAV such that a user selects a specific object as a subject to be captured, on the preview video. In some embodiments, the electronic device may select a specific portion of the object as a subject to be captured. For example, if a person who wears a hat is provided as the preview video, the electronic device may select the hat as a subject to be captured, by selection of the user.

In operation 1620, the electronic device may obtain location information of the selected subject and may start to track a video of the subject. According to an embodiment, the electronic device may obtain location information of the subject through the GPS, the positioning system using the mobile network, the fingerprint scheme, or the like.

In operation 1630, the electronic device may start to capture a video using the camera installed in the UAV and may start to record the captured video. According to an embodiment, the electronic device may transmit a driving signal for the camera to the UAV and may store a capture video obtained from the UAV in the memory.

In operation 1640, the electronic device may move the UAV to a relative location from the subject. According to an embodiment, the electronic device may move the UAV to a relative location from the subject based on information set by a user. For example, the electronic device may move the UAV with respect to information about a latitude difference, a longitude difference, and an altitude difference corresponding to a separation distance from an object set by the user.

In operation 1650, the electronic device may record (or log) data received in real time from the UAV. According to an embodiment, the electronic device may store a coordinate, a time, sensing data, or the like of the UAV in the memory in real time.

In operation 1660, the electronic device may determine whether an event occurs. The event may indicate a change in state, for example, indicate that a speed of the UAV is changed or that an angle of view of a camera installed in the UAV is changed.

If the event occurs, in operation 1670, the electronic device may record (or log) an event of a corresponding interval. For example, the electronic device may store information, corresponding to location movement of the UAV, a change in an altitude of the UAV, a change in a speed of the UAV, a change in an angle of view of the camera, or the like, together with a time when the event occurs in the memory.

In operation 1680, the electronic device may capture a video in real time using the camera and may record (or log) data. For example, if the event is ended or if the event does not occur, the electronic device may continuously record a video and may store a coordinate, a time, sensing data, or the like of the UAV in the memory.

In operation 1690, the electronic device may end the video capture and may store a logging file in the memory. For example, the electronic device may end the video capture and may store a logged file in the memory through an operation of a user, for example, if the user selects a video capture stop button or if the UAV makes a landing.

The logged file may correspond to flight information of the UAV. In some embodiments, the electronic device may include logging data included in the logged file in metadata of a capture video.

According to various embodiments, operations 1610 to 1690 may be performed by the UAV. In this case, the UAV may transmit a capture video and a logging file (or flight information) generated as a result to an electronic device which controls the UAV.

Figure 17:
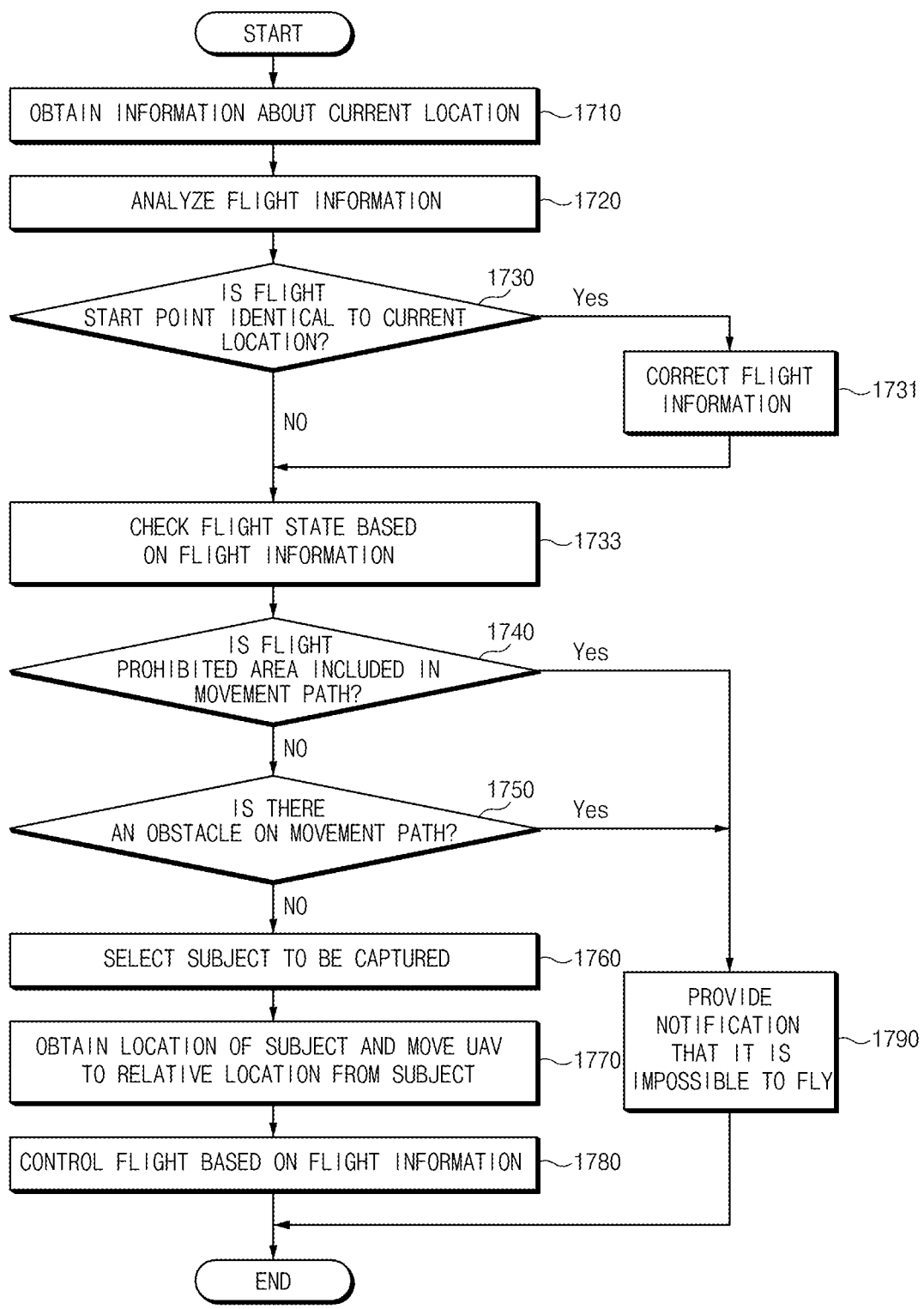
FIG. 17 illustrates a flowchart of a method for using relative location information of a UAV, included in flight information, according to various embodiments of the present disclosure.

FIG. 17 illustrates a flowchart of a method for using relative location information of a UAV, included in flight information, according to various embodiments of the present disclosure.

Referring to FIG. 17, in operation 1710, an electronic device may obtain information about a current location of the UAV. According to an embodiment, the electronic device may obtain the current location information of the UAV through a GPS, a positioning system using a mobile network, a fingerprint scheme, or the like.

In operation 1120, the electronic device may analyze previously obtained flight information. For example, the electronic device may extract information about a video capture start point or a flight start point from the flight information.

In operation 1730, the electronic device may determine whether the current location information of the UAV is identical to a flight start point included in the flight information. According to an embodiment, the electronic device may determine whether a coordinate area corresponding to the flight start point is identical to a coordinate area indicating the current location.

If the flight start point included in the flight information is not identical to the current location, in operation 1731, the electronic device may calibrate the flight information. For example, the electronic device may locate the UAV to capture a video on a specific point and may perform flight of the UAV by using the specific point as a flight start location. In this case, the electronic device may calibrate the flight information such that the specific point is the flight start point. For example, the electronic device may calibrate location values of the UAV, included in the flight information, using a difference value between the specific point and a flight start point included in the flight information.

In operation 1733, the electronic device may check a flight state of the UAV based on the flight information. For example, the electronic device may determine a movement path where the UAV will really fly, through location values of the UAV, which is included in the flight information or is calibrated.

In operation 1740, the electronic device may determine whether the movement path is included in a flight prohibited area (or a flight restricted area). According to an embodiment, the electronic device may receive map data from an external server and may determine whether the movement path is included in the flight prohibited area included in the map data.

If the movement path is included in the flight prohibited area, in operation 1790, the electronic device may inform a user that it is impossible to fly. For example, the electronic device may output a display object, for informing the user that it is impossible to fly using the movement path, on its display.

If the movement path is not included in the flight prohibited area, in operation 1750, the electronic device may determine whether there is an obstacle on the movement path. For example, the electronic device may determine whether a feature included in the map data is an obstacle on the movement path. If there is the obstacle on the movement path, the electronic device may perform operation 1790.

If there is no the obstacle on the movement path, in operation 1760, the electronic device may select a subject to be captured. According to an embodiment, the electronic device may display a video (e.g., a preview video) captured by a camera installed in the UAV on the display such that the user selects a specific object (or a specific part of the specific object) as a subject to be captured, on the preview video. Alternatively, the electronic device may output a reference video associated with the flight information on the display such that the user selects a specific object as a subject to be captured, on the reference video.

In operation 1770, the electronic device may obtain location information of the selected subject and may move the UAV to a relative location from the subject. According to an embodiment, the electronic device may move the UAV on the basis of information about a latitude difference, a longitude difference, and an altitude difference corresponding to a separation distance between the UAV and the subject.

In operation 1780, the electronic device may control flight of the UAV based on the flight information. According to an embodiment, the electronic device may generate a control signal for controlling flight of the UAV using the flight information and may transmit the control signal to the UAV. The control signal may include a flight control signal corresponding to flight pattern information of the UAV and a camera control signal corresponding to driving information of a camera installed in the UAV.

Figure 18:
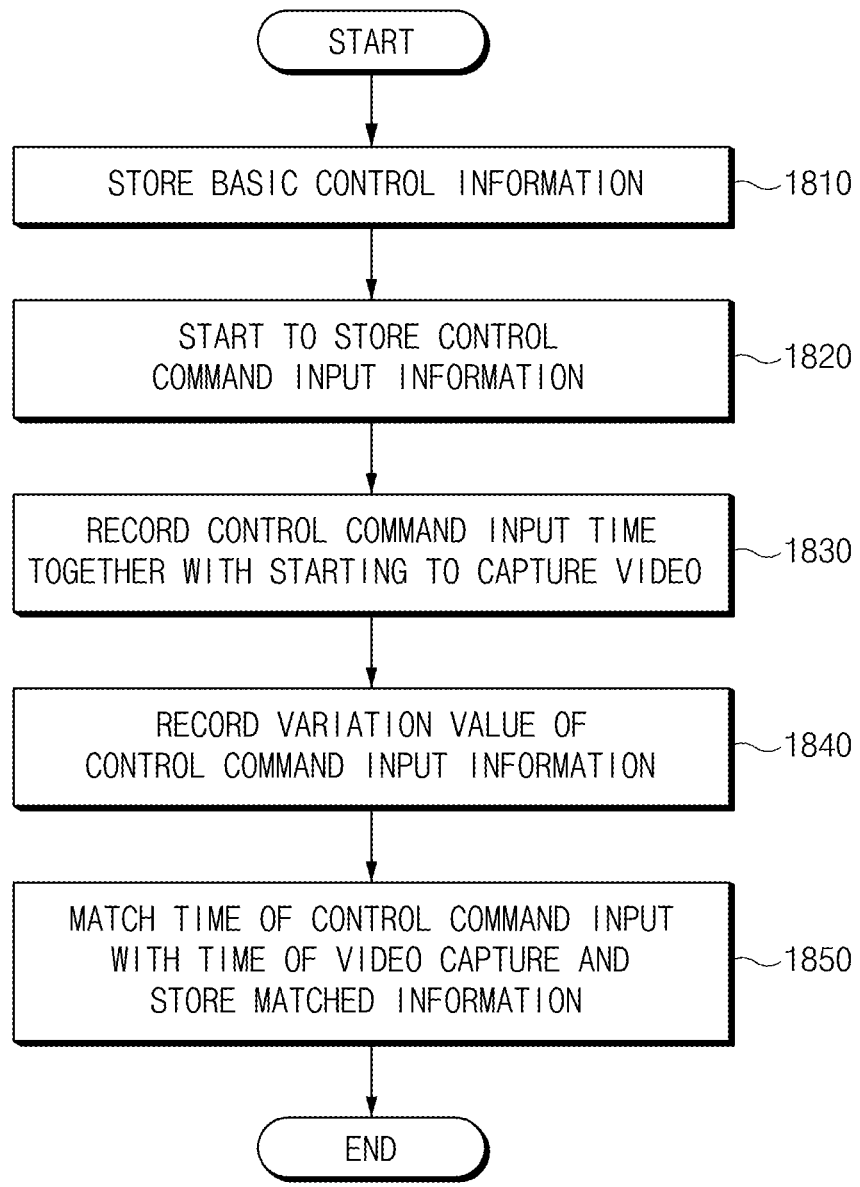
FIG. 18 illustrates a flowchart of a method for configuring flight information using a control signal of a UAV according to various embodiments of the present disclosure.

FIG. 18 illustrates a flowchart of a method for configuring flight information using a control signal of a UAV according to various embodiments of the present disclosure.

According to an embodiment, the UAV may capture a video and may include information about a control signal (or command) (e.g., a flight control signal or a camera control signal) input to the UAV in metadata of a video which is being captured. In this case, the included control signal information of the UAV may include time information such as a control command input start time and input duration of a user. The control signal information of the UAV may include a variation value of a pitch, a roll, a yaw, or a throttle, received from an electronic device when the UAV is moved and may include a speed value, a rotation angle, or the like transmitted to the UAV when each command is performed.

Referring to FIG. 18, in operation 1810, the electronic device may store its basic control information in its memory. The basic control information may include, for example, a maximum speed value, each control variation value, or the like.

In operation 1820, the electronic device may start to store control command input information. The control command input information may include time information such as a control command input start time and input duration.

In operation 1830, the electronic device may record a currently input control command input time together with starting to capture a video. For example, the electronic device may link a time when video capture is started to a control command input time to store the linked time information in the memory.

In operation 1840, the electronic device may record a variation value of control command input information. According to an embodiment, the electronic device may store a variation value in pitch, roll, yaw, throttle, speed, or the like in the memory. In this case, the electronic device may link a variation value of the control command input information to information of a time when the control command input information is changed to store the linked information in the memory.

In operation 1850, the electronic device may match a time of a control command input with a time of video capture and may store the matched time information in the memory. According to an embodiment, the electronic device may match time information of the control command input with time information of the video capture to store the matched information in the memory.

In some embodiments, the electronic device may link the control command input information with location information or attitude information included in flight information of the UAV and may store the linked information in the memory.

Figure 19:
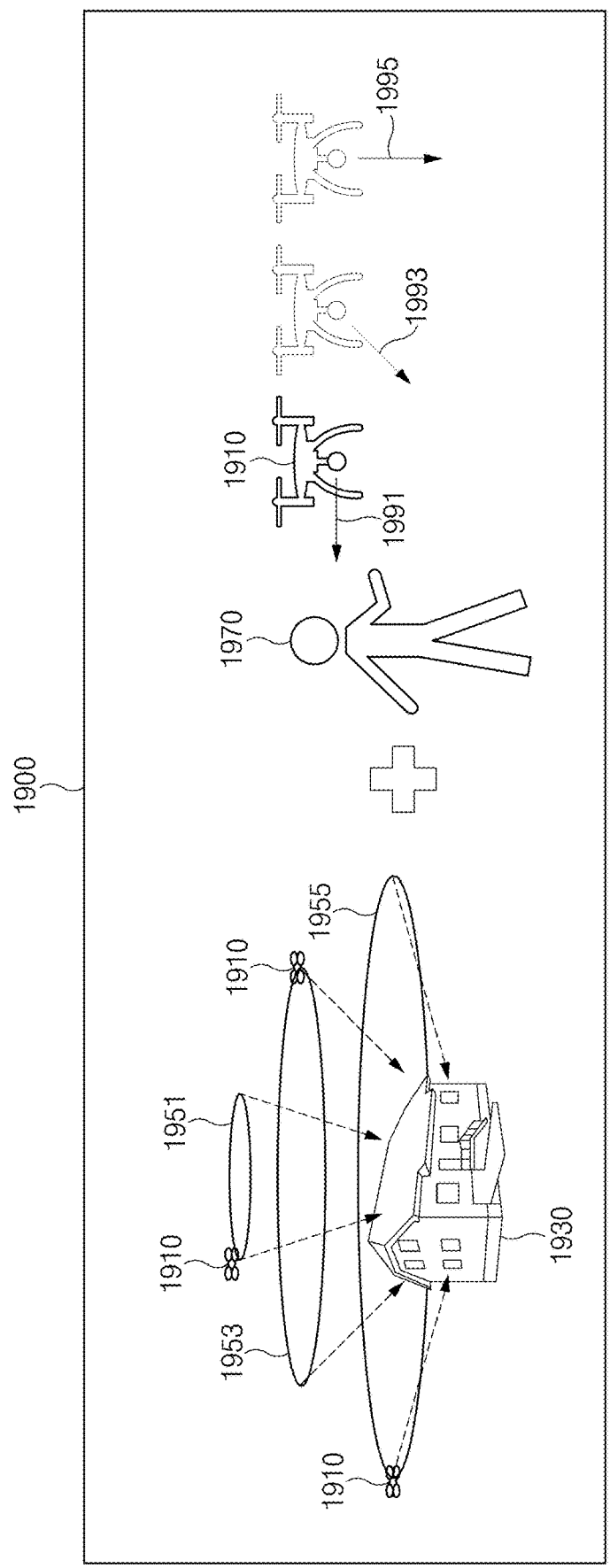
FIG. 19 illustrates a method for configuring flight information of a UAV using a simulation program according to various embodiments of the present disclosure.

FIG. 19 illustrates a method for configuring flight information of a UAV using a simulation program according to various embodiments of the present disclosure.

Referring to FIG. 19, a user may configure flight information of a UAV 1910 using the simulation program. For example, the user may previously specify a moving line (or a flight pattern) by which the UAV 1910 may move, using a screen 1900 including a 3D map, a virtual space map, or the like provided by the simulation program. According to an embodiment, the user may specify an operation, such as flight or video capture, while moving the virtual UAV 1910 around a specified subject 1930 in a 3D environment provided by an electronic device such as a PC. In this case, the electronic device may generate flight information using virtual flight pattern information and video capture information through the simulation program. Thus, the user may generate the flight information while directly verifying whether it is possible to obtain any capture video through a virtual operation of the UAV 1910 on a screen. For example, the user may previously verify a virtual capture video of the UAV 1910 around the specified subject 1930 through the simulation screen 1900.

As shown in FIG. 19, the user may perform simulation such that the UAV 1910 flies around the specified subject 1930 by a first flight pattern 1951, a second flight pattern 1953, a third flight pattern 1955, or the like. Further, the user may perform simulation to capture a video while changing composition of a camera which captures a specified subject 1970 to first composition 1991, second composition 1933, third composition 1995, or the like.

According to an embodiment, information in which the user operates the UAV 1910 through the simulation program may be stored in the form of reference data. The information in the form of the reference data may be changed to preset data to use the preset data. In this case, the reference data may include 3D location information of the UAV 1910 and may also include attitude information of the UAV 1910. According to another embodiment, the reference data may include control signal information for controlling the UAV 1910.

Figure 20:
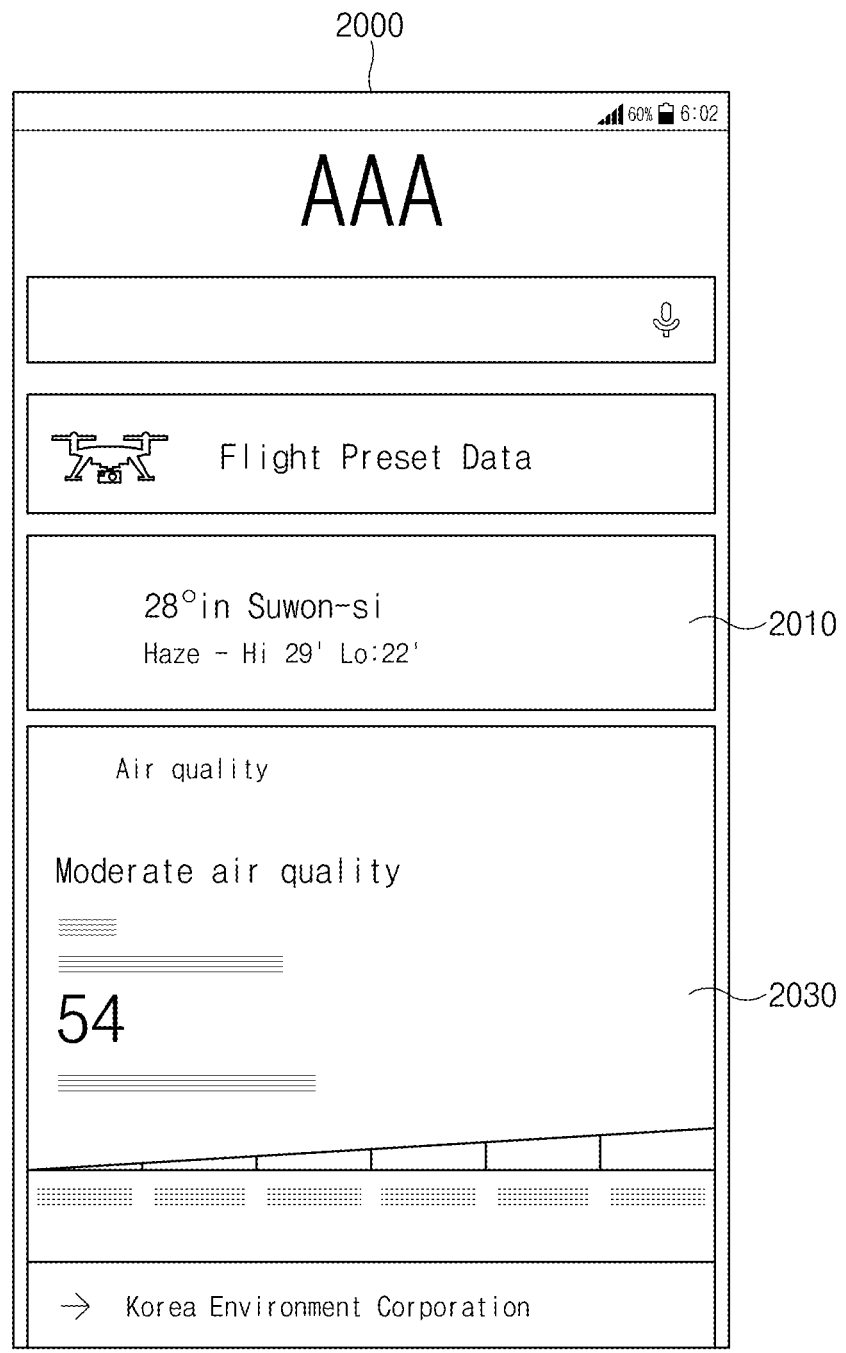
FIG. 20 illustrates a method for sharing flight information through a data shared server according to various embodiments of the present disclosure.
Figure 21:
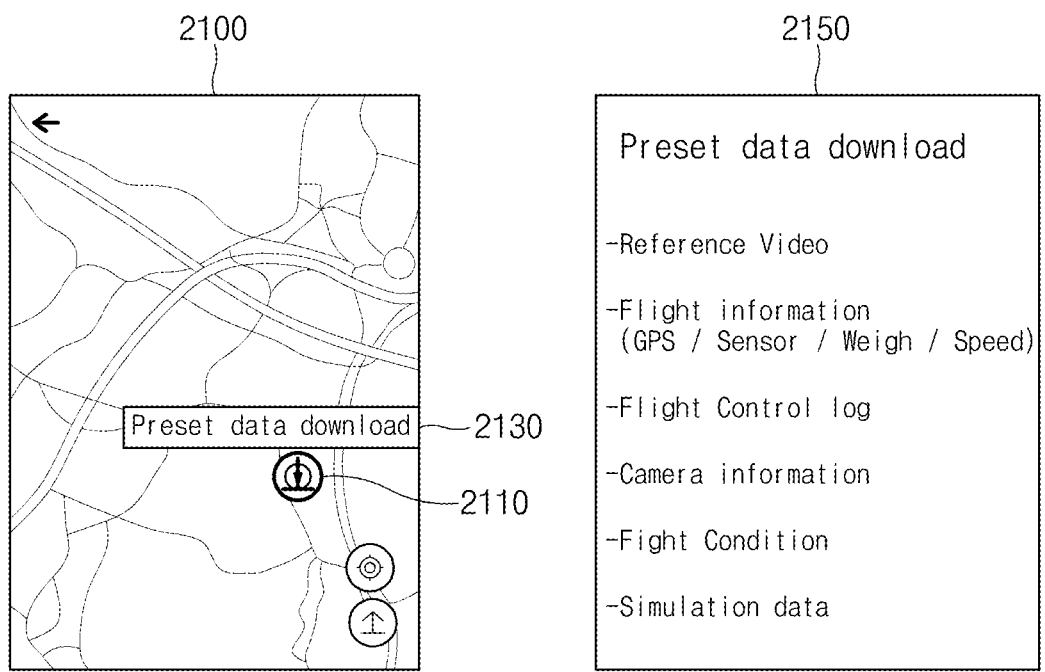
FIG. 21 illustrates a screen of sharing flight information through a shared server according to various embodiments of the present disclosure.

FIG. 20 illustrates a method for sharing flight information through a data shared server according to various embodiments of the present disclosure. FIG. 21 illustrates a screen of sharing flight information through a shared server according to various embodiments of the present disclosure.

Referring to FIGS. 20 and 21, flight information (or preset data) may be provided to a user in various forms. According to an embodiment, the flight information may be included in reference video and may be registered in the shared server. The use may obtain the flight information by downloading the reference video registered in the shared server. The shard server may include, for example, a data shared server which provides a location-based recommendation service. For example, if there is history in which an electronic device is connected with a UAV over a wired and wireless network and if the electronic device is located in a specific area, the electronic device may search a shared site provided by the shared server for a video (e.g., reference video) captured in the specific area using the UAV and may output the found video on its display. Further, as shown in FIG. 20, the electronic device may provide a guide for capturing substantially the same video as the reference video using flight information corresponding to the reference video. As shown in FIG. 20, FIG. 20 illustrates a state where the electronic device outputs a screen including information 2010 about an area where the reference video is captured and flight environment information 2030 on a display 2000. In some embodiments, if there are a plurality of videos captured in the specific area, the electronic device may search for and provide a reference video most suitable for a current flight environment (e.g., weather).

According to an embodiment, if an event in which the electronic device is connected with the UAV over a wired and wireless network occurs, the electronic device may search the shared site for a video captured in the specific area and may display the found video on the display. Further, as shown in FIG. 21, the electronic device may provide a user interface for downloading and using flight information linked with the reference video. As shown in FIG. 21, FIG. 21 illustrates a state where the electronic device outputs a notification display object 2130 of contents that it is possible to download flight information corresponding to a reference video captured in the specific area and a location display object 2110 indicating the specific area together with a map screen 2100 including the specific area. In this case, if a user selects the notification display object 2130 or the location display object 2110, the electronic device may output a screen 2150 indicating detailed information about the flight information on the display.

According to an embodiment, if the user detaches a battery to exchange the battery of a UAV after operating the UAV or if the user connects a charger to the UAV, the electronic device may search the shared site for a capture video of another UAV, captured in a current location in response to the event (e.g., a power related event) and may output the found video on the display. According to another embodiment, if transmission of a video captured by the UAV to the electronic device is completed, the electronic device may search the shared site for a capture video of another UAV, captured in a current location in response to the event (e.g., a communication related event) and may output the found video on the display.

According to an embodiment, if a capture video of another UAV with a similar flight pattern to a video captured by a UAV currently controlled from the electronic device exists in the shared server, the electronic device may provide a screen recommended to the user to search for the video and use the found video as a reference video. For example, if a video having preset data collected and generated by a UAV currently controlled and another preset data with high similarity exists in the shared server, the electronic device may search for the video and may recommend the found video to the user.

According to an embodiment, a service provider of the shared site may configure specific preset data in advance for a specific place or environment or a specific operation and may sell the preset data to the user with charge. For example, in case of the specific place, the service provider may provide at least part of reference video captured in the specific place to a user located in the specific location and may provide detailed flight information about the reference video with charge. For another example, in case of the specific environment, the service provider may provide various reference videos in consideration of surrounding weather, a wind speed, intensity of illumination, or the like and may sell flight information corresponding to the various reference videos. For another example, in case of the specific operation, the service provider may separately provide a dynamic reference video or a static reference video to the user depending on an intention to be connected and may sell flight information corresponding to the dynamic reference video or the static reference video.

Figure 22:
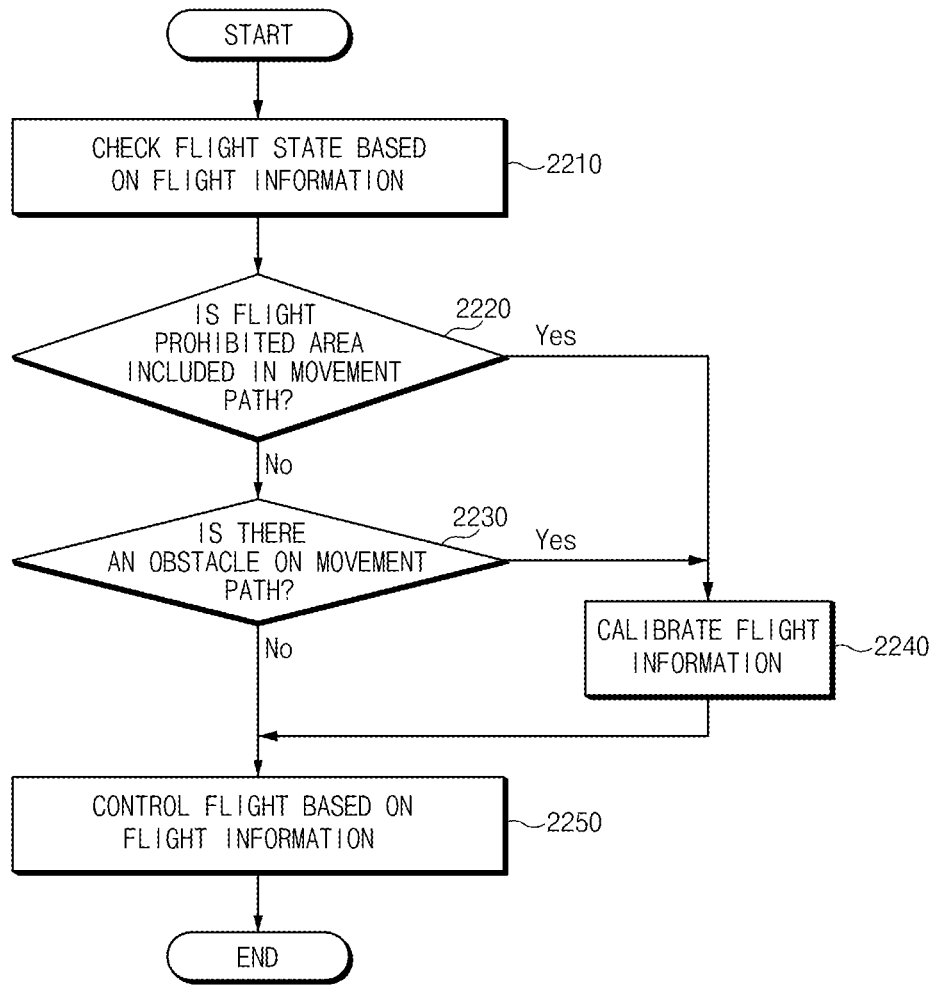
FIG. 22 illustrates a flowchart of an operation method of an electronic device associated with calibration of flight information according to various embodiments of the present disclosure.

FIG. 22 is a flowchart illustrating an operation method of an electronic device associated with calibration of flight information according to an embodiment.

Referring to FIG. 22, in operation 2210, the electronic device may check a flight state of a UAV based on flight information. For example, the electronic device may determine a movement path, in which the UAV will really fly, through location values of the UAV, included in the flight information.

In operation 2220, the electronic device may determine whether the movement path is included in a flight prohibited area (or a flight restricted area). According to an embodiment, the electronic device may receive map data from an external server and may determine whether the movement path is included in the flight prohibited area included in the map data.

If the movement path is included in the flight prohibited area, in operation 2240, the electronic device may calibrate the flight information. For example, the electronic device may calibrate the flight information such that the movement path does not enters the flight prohibited area or may calibrate the flight information such that the UAV makes a detour around an obstacle which exists on the movement path.

If the movement path is not included in the flight prohibited area, in operation 2230, the electronic device may determine whether there is an obstacle on the movement path. For example, the electronic device may determine whether a feature included in the map data is an obstacle on the movement path. If there is the obstacle on the movement path, the electronic device may perform operation 2240.

If there is no the obstacle on the movement path, in operation 2250, the electronic device may control flight of the UAV based on the flight information.

In some embodiments, if the movement path is included in the flight prohibited area or if there is an obstacle on the movement, the electronic device may inform a user that it is impossible to fly. For example, the electronic device may output a display object, for informing the user that it is impossible to fly using the movement path, on its display.

Figure 23A:
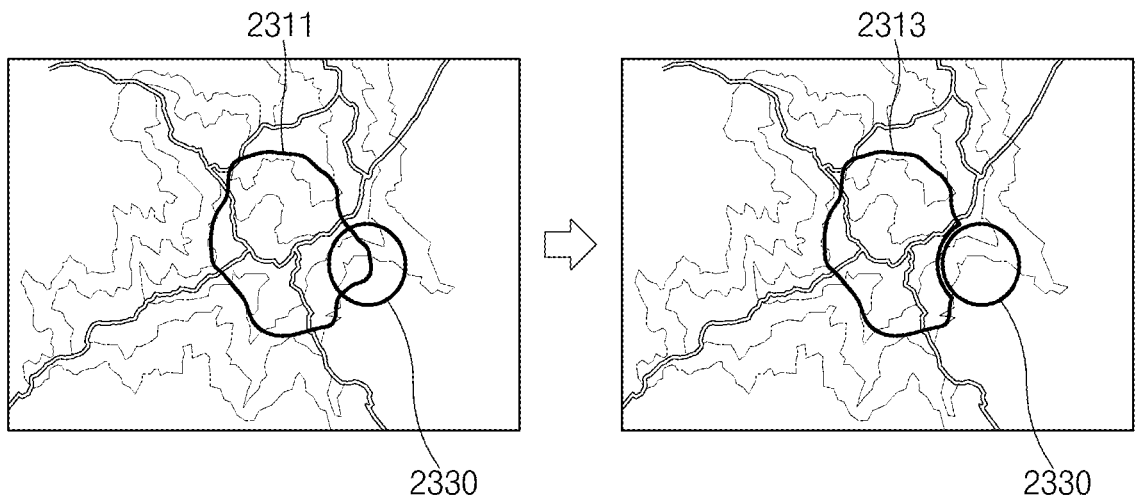
FIG. 23A illustrates a screen associated with calibrating flight information according to various embodiments of the present disclosure.
Figure 23B:
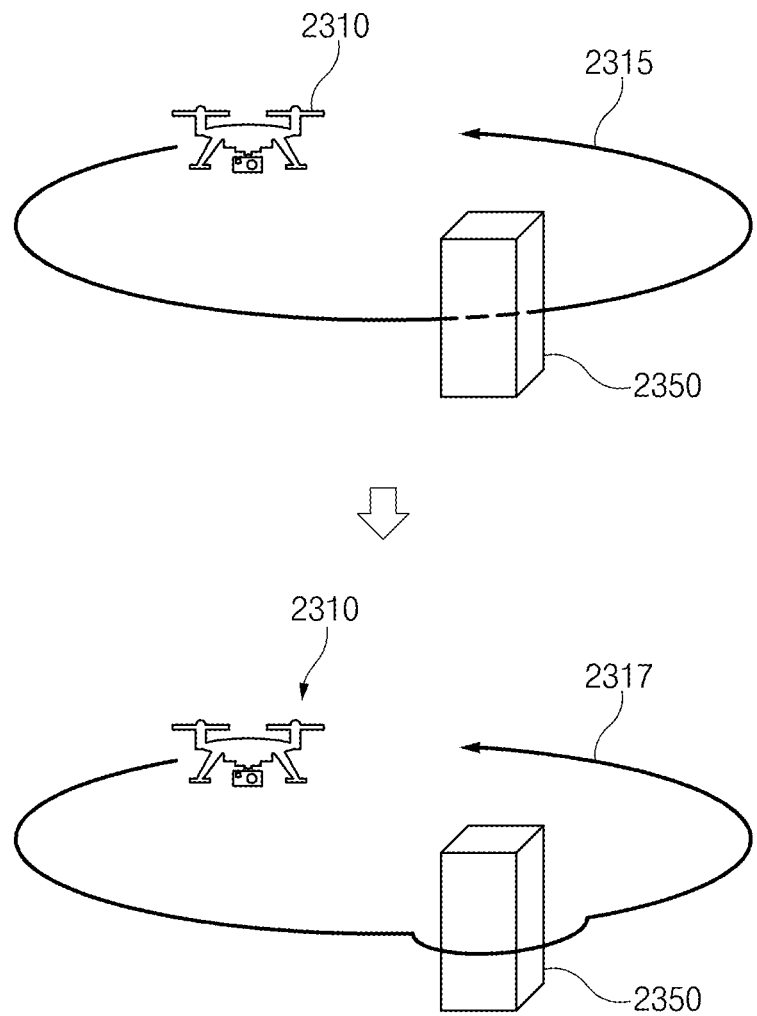
FIG. 23B illustrates another screen associated with calibrating flight information according to various embodiments of the present disclosure.

FIG. 23A illustrates a screen associated with calibrating flight information according to various embodiments of the present disclosure. FIG. 23B illustrates another screen associated with calibrating flight information according to various embodiments of the present disclosure.

Referring to FIGS. 23A and 23B, if determining that it is difficult to perform normal movement by flight information by a real obstacle while a UAV 2310 captures a video using flight information, the electronic device may stop flight and video capture of the UAV 2310 and may wait for the UAV 2310 in a current location. Further, the electronic device may inform a user that it is impossible for the UAV 2310 to fly. In this case, if the user resumes flight and video capture of the UAV 2310 after making a detour around an obstacle through a manual operation, the electronic device may control flight of the UAV 2310 using the remaining flight information based on a relative location from a moved location.

According to an embodiment, the electronic device may check a flight state, for example, an obstacle upon flight, threat of a collision, whether it is possible to fly, whether flight is permitted, or the like, using 3D map data and the like before the UAV 2310 really flies based on the flight information. Thus, as shown in FIG. 23A, if a flight path 2311 of the UAV 2310 is included in a flight prohibited area 2330, the electronic device may calibrate flight information such that the flight path 2311 departs from the flight prohibited area 2330. For example, the electronic device may calibrate the flight information such that the UAV 2310 makes a detour around the flight prohibited area 2330 in a flight interval where the UAV 2310 passes through the flight prohibited area 2330 on the flight path 2311 and may control the UAV 2310 such that the UAV 2310 flies and capture a video on a new flight path 2313. For another example, as shown in FIG. 23B, if there is an obstacle 2350 on a flight path 2315 of the UAV 2310, the electronic device may calibrate the flight information such that the UAV 2310 makes a detour around the obstacle 2350 in a flight interval which is obstructed by the obstacle 2350 on the flight path 2315 and may control the UAV 2310 such that the UAV 2310 flies and captures a video on a new flight path 2317.

As described above, according to various embodiments, a flight control method of a UAV having a camera may include obtaining first flight information including a first flight pattern for a first location and first driving information of the camera, the first driving information corresponding to the first flight pattern, determining a flight reference location of the UAV, and controlling the UAV via the communication circuit such that the UAV flies based on the determined flight reference location and the first flight information.

According to various embodiments, the controlling of the UAV may include transmitting the determined flight reference location and the first flight information to the UAV via the communication circuit.

According to various embodiments, the controlling of the UAV may include generating control signal information about the UAV using the determined flight reference location and the first flight information, and transmitting the control signal information to the UAV via the communication circuit.

According to various embodiments, the determining of the flight reference location of the UAV may include determining the flight reference location based on a second location of the UAV and the first location. The second location may be a current location of the UAV.

According to various embodiments, the method may further include calibrating the first flight pattern as a second flight pattern to make a detour around the obstacle if an obstacle exists on a flight path of the UAV, calibrating the first driving information as second driving information to correspond to the second flight pattern, and controlling the UAV via the communication circuit such that the UAV flies based on second flight information including the second flight pattern and the second driving information and the determined flight reference location.

According to various embodiments, the obtaining of the first flight information may include obtaining a relative location for a specified objet as the first location.

According to various embodiments, the obtaining of the first flight information may include obtaining a pattern of control signal information about the UAV as the first flight pattern.

Figure 24A:
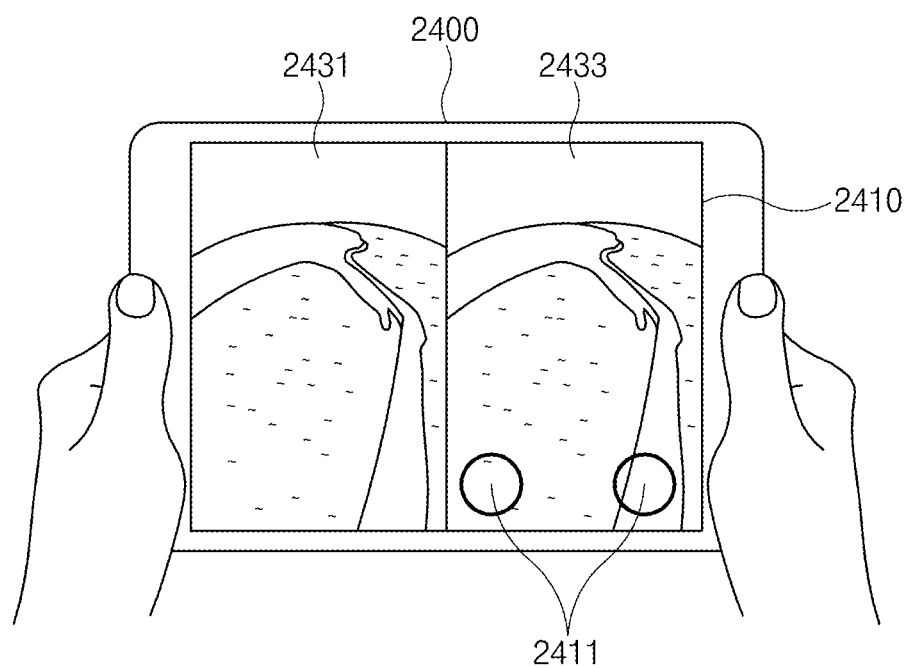
FIG. 24A illustrates a first screen which outputs a capture video of a UAV according to various embodiments of the present disclosure.
Figure 24B:
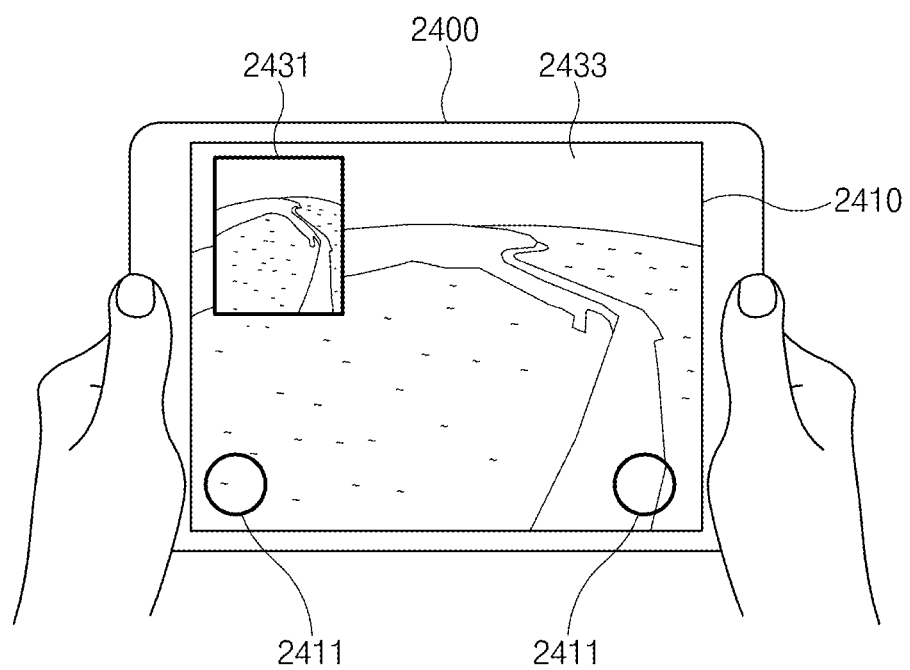
FIG. 24B illustrates a second screen which outputs a capture video of a UAV according to various embodiments of the present disclosure.
Figure 24C:
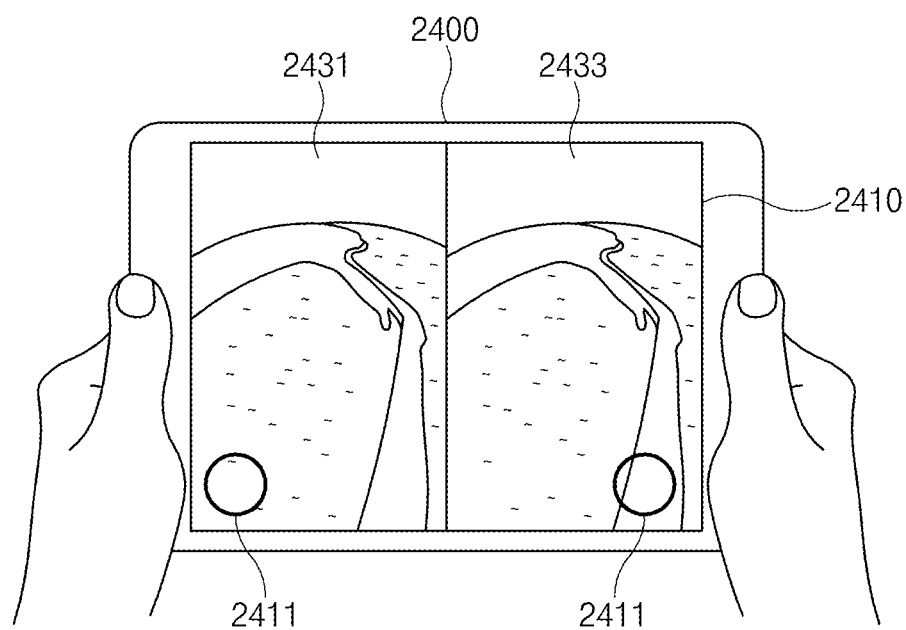
FIG. 24C illustrates a third screen which outputs a capture video of a UAV according to various embodiments of the present disclosure; and Throughout the drawings, it should be noted that like reference numbers are used to depict the same or similar elements, features, and structures.

FIG. 24A illustrates a first screen which outputs a capture video of a UAV according to various embodiments of the present disclosure. FIG. 24B illustrates a second screen which outputs a capture video of a UAV according to an embodiment. FIG. 24C illustrates a third screen which outputs a capture video of a UAV according to various embodiments of the present disclosure.

Referring to FIGS. 24A to 24C, an electronic device 2400 may output a video 2433 captured by a camera installed in a UAV on a display 2410. According to an embodiment, if the UAV flies and capture a video based on flight information included in a reference video 2431, the electronic device 2400 may output the reference video 2431 together with the captured video 2433 on the display 2410. For example, as shown in FIG. 24A, the electronic device 2400 may divide a screen of the display 2410 at a specified rate and may output the reference video 2431 and the captured video 2433 on the divided regions, respectively. Embodiments are not limited thereto. In some embodiments, as shown in FIG. 24B, the electronic device 2400 may output the captured video 2433 to be suitable for the entire screen rate of the display 2410, may configure the reference video 2431 on a small screen region, and may output the configured reference video on a predetermined region of the captured video 2433. Further, a control button object 2411 for controlling the UAV may be output on any region of the display 2410 without being limited to only a region where the captured video 2433 is output. For example, as shown in FIG. 24C, the control button object 2411 may be output on a predetermined region of the reference video 2431.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 230), the processor may perform functions corresponding to the instructions. The computer-readable storage medium may be, for example, the memory 210.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
a communication circuit;
a memory; and
a processor operatively connected to the communication circuit and the memory, and configured to:
determine a flight reference location of an unmanned aerial vehicle (UAV) based on a start point of a flight pattern stored in the memory and a current location of the UAV;
determine a flight path for the UAV based on the flight reference location and the flight pattern; and
control the UAV via the communication circuit such that the UAV flies based on the determined flight path,
wherein the processor is further configured to:
if the flight path is included in a flight prohibited area determined from map data received from an external server, calibrate the flight path such that the UAV does not enter the flight prohibited area.

2. The electronic device of claim 1, wherein the processor is further configured to:
transmit the determined flight reference location and the flight path to the UAV via the communication circuit, as at least part of controlling the UAV.

3. The electronic device of claim 1, wherein the processor is further configured to:
generate control signal information about the UAV using the determined flight reference location and the flight path and transmit the control signal information to the UAV via the communication circuit, as at least part of controlling the UAV.

4. The electronic device of claim 1, wherein the determined flight reference location includes a relative location for a specified object, the relative location comprising a position of the specified object with respect to the electronic device.

5. The electronic device of claim 1, wherein the flight pattern includes a pattern of control signal information about the UAV.

6. An electronic device, comprising:
a display;
a user input interface configured to be detached or integrated with the display;
at least one wireless communication circuit configured to establish a wireless communication channel with an unmanned aerial vehicle (UAV) including a camera;
a processor configured to be electrically connected with the display, the user input interface, and the at least one wireless communication circuit; and
a memory configured to be electrically connected with the processor,
wherein the memory stores instructions, when executed, causing the processor to:
store at least one or more previously configured flight paths in the memory;
establish a wireless communication channel with the UAV using the at least one wireless communication circuit;
receive a user input for selecting a flight path of the at least one or more previously configured flight paths through the user input interface;
receive first geographic data associated with at least one of the electronic device and the UAV using the at least one wireless communication circuit;
calibrate the selected flight path based on at least part of the received first geographic data; and
transmit information about the calibrated flight path to the UAV over the wireless communication channel,
wherein the instructions, when executed, further cause the processor to:
if the selected flight path is included in a flight prohibited area determined from the first geographic data, calibrate the selected flight path such that the UAV does not enter the flight prohibited area.

7. The electronic device of claim 6, wherein the memory stores instructions, when executed, causing the processor to:
receive video data associated with second geographic data different from the first geographic data using the at least one wireless communication circuit;
output a video on the display based on the video data;
receive a user input for selecting the video; and
extract the flight path based on at least part of the video data.

8. The electronic device of claim 6, wherein the memory further stores instructions, when executed, causing the processor to:
transmit a control signal to the UAV over the wireless communication channel such that the camera faces or tracks a selected object or the electronic device while the UAV moves along the calibrated flight path.

9. The electronic device of claim 6, wherein the memory further stores instructions, when executed, causing the processor to:

change at least one of an altitude, a coordinate, or a speed of the selected flight path.

10. The electronic device of claim 6, wherein the memory further stores instructions, when executed, causing the processor to:
    transmit a signal associated with driving the camera to the UAV over the wireless communication channel based on at least one of direction information, angle of view information, or zoom information of the camera associated with the selected flight path.

11. The electronic device of claim 10, wherein the at least one of the direction information, the angle of view information, or the zoom information of the camera is included in metadata of a video corresponding to the selected flight path.

12. A flight control method of an unmanned aerial vehicle (UAV) including a camera, the method comprising:
    obtaining first flight information including a first flight pattern for a first location and first driving information of the camera, the first driving information corresponding to the first flight pattern;
    determining a flight reference location of the UAV;
    determining a flight path based on the flight reference location and the first flight information;
    if the flight path is included in a flight prohibited area determined from map data received from an external server, calibrating the flight path such that the UAV does not enter the flight prohibited area; and
    controlling the UAV via a communication circuit such that the UAV flies based on the determined flight path.

13. The method of claim 12, wherein the controlling of the UAV includes:
    transmitting the determined flight reference location and the first flight information to the UAV via the communication circuit.

14. The method of claim 12, wherein the controlling of the UAV includes:
    generating control signal information about the UAV using the determined flight reference location and the first flight information; and
    transmitting the control signal information to the UAV via the communication circuit.

15. The method of claim 12, wherein the determining of the flight reference location of the UAV includes:
    determining the flight reference location based on a second location of the UAV and the first location,
    wherein the second location is a current location of the UAV.

16. The method of claim 12, further comprising:
    if an obstacle exists on a flight path of the UAV, calibrating the first flight pattern as a second flight pattern to make a detour around the obstacle;
    calibrating the first driving information as second driving information to correspond to the second flight pattern; and
    controlling the UAV via the communication circuit such that the UAV flies based on second flight information including the second flight pattern and the second driving information and the determined flight reference location.

17. The method of claim 12, wherein the obtaining of the first flight information includes:
    obtaining a relative location for a specified object as the first location, the relative location comprising a position of the specified object with respect to the UAV.

18. The method of claim 12, wherein the obtaining of the first flight information includes:
    obtaining a pattern of control signal information about the UAV as the first flight pattern.

* * * * *